US011716128B2

(12) United States Patent
Rahman et al.

(10) Patent No.: US 11,716,128 B2
(45) Date of Patent: Aug. 1, 2023

(54) FULL POWER UPLINK TRANSMISSION FOR WIRELESS COMMUNICATION SYSTEMS

(71) Applicant: Samsung Electronics Co., Ltd., Suwon-si (KR)

(72) Inventors: Md. Saifur Rahman, Plano, TX (US); Eko Onggosanusi, Coppell, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 291 days.

(21) Appl. No.: 17/210,480

(22) Filed: Mar. 23, 2021

(65) Prior Publication Data

US 2021/0314037 A1    Oct. 7, 2021

Related U.S. Application Data

(60) Provisional application No. 63/030,430, filed on May 27, 2020, provisional application No. 63/030,238, filed on May 26, 2020, provisional application No. 63/015,396, filed on Apr. 24, 2020, provisional application No. 63/003,565, filed on Apr. 1, 2020.

(51) Int. Cl.
| | | |
|---|---|---|
| *H04B 7/0456* | (2017.01) | |
| *H04B 7/06* | (2006.01) | |
| *H04L 5/00* | (2006.01) | |
| *H04L 25/02* | (2006.01) | |
| *H04W 8/24* | (2009.01) | |
| *H04B 7/0404* | (2017.01) | |

(52) U.S. Cl.
CPC ......... *H04B 7/0486* (2013.01); *H04B 7/0639* (2013.01); *H04L 5/0051* (2013.01); *H04L 25/0226* (2013.01); *H04W 8/24* (2013.01); *H04B 7/0404* (2013.01)

(58) Field of Classification Search
CPC ...... H04B 7/0456; H04B 7/06; H04B 7/0404; H04L 5/00; H04L 25/02; H04W 8/24; H04W 52/36; H04W 52/42
See application file for complete search history.

(56) References Cited

FOREIGN PATENT DOCUMENTS

WO    2019203619 A1    10/2019

OTHER PUBLICATIONS

"Correction on UL full power transmission". RI-2000635. 3GPP TSG RAN WGJ #100-e. e-Meeting—Mar. 6, 2020 (Year: 2020).*
International Search Report dated Jul. 13, 2021 in connection with International Application No. PCT/KR2021/004053, 3 pages.

(Continued)

*Primary Examiner* — Walter J Divito
*Assistant Examiner* — Anthony Luo

(57) ABSTRACT

A method for operating a user equipment (UE) for an uplink (UL) transmission, comprising: receiving a configuration information including a full power mode and indicating an UL codebook, wherein: the UL codebook is one of a first codebook and a second codebook, when the full power mode is set to full power mode 1, and the UL codebook is one of the first codebook, the second codebook, and a third codebook, when the full power mode is either not provided or is set to a value other than the full power mode 1; identifying the UL codebook to use for the UL transmission based on the configuration information; and transmitting the UL transmission based on the UL codebook.

20 Claims, 12 Drawing Sheets

(56) References Cited

OTHER PUBLICATIONS

CATT, "Remaining issues on UL full power transmission," R1-2000536, 3GPP TSG RAN WG1#100-e, e-Meeting, Feb. 24-Mar. 6, 2020, 5 pages.
Apple, "Remaining Issues for UL Full Power Transmission Enhancement," R1-2000862, 3GPP TSG RAN WG1#100-e, e-Meeting, Feb. 24-Mar. 6, 2020, 4 pages.
Oppo, "Text proposals for full TX power UL transmission," R1-2000459, 3GPP TSG RAN WG1#100-e, e-Meeting, Feb. 24-Mar. 6, 2020, 8 pages.
Samsung, "Correction on UL full power transmission," R1-2000635, 3GPP TSG RAN WG1#100-e, e-Meeting, Feb. 24-Mar. 6, 2020, 7 pages.
"3rd Generation Partnership Project; Technical Specification Group Radio Access Network; Evolved Universal Terrestrial Radio Access (E-UTRA); Physical channels and modulation (Release 16)", 3GPP TS 36.211 V16.4.0, Dec. 2020, 249 pages.
"3rd Generation Partnership Project; Technical Specification Group Radio Access Network; Evolved Universal Terrestrial Radio Access (E-UTRA); Multiplexing and channel coding (Release 16)", 3GPP TS 36.212 V16.4.0, Dec. 2020, 254 pages.
"LTE; Evolved Universal Terrestrial Radio Access (E-UTRA); Physical layer procedures (3GPP TS 36.213 version 16.4.0 Release 16)", ETSI TS 136 213 V16.4.0, Feb. 2021, 577 pages.
"3rd Generation Partnership Project; Technical Specification Group Radio Access Network; Evolved Universal Terrestrial Radio Access (E-UTRA); Medium Access Control (MAC) protocol specification (Release 16)", 3GPP TS 36.321 V16.3.0, Dec. 2020, 142 pages.
"LTE; Evolved Universal Terrestrial Radio Access (E-UTRA); Radio Resource Control (RRC); Protocol specification (3GPP TS 36.331 version 16.3.0 Release 16)", ETSI TS 136 331 V16.3.0, Jan. 2021, 1089 pages.
"3rd Generation Partnership Project; Technical Specification Group Services and System Aspects; Feasibility Study on New Services and Markets Technology Enablers; Stage 1 (Release 14)", 3GPP TR 22.891 V14.2.0, Sep. 2016, 95 pages.
"3rd Generation Partnership Project; Technical Specification Group Radio Access Network; NR; Physical channels and modulation (Release 16)", 3GPP TS 38.211 V16.4.0, Dec. 2020, 133 pgs.
"3rd Generation Partnership Project; Technical Specification Group Radio Access Network; NR; Multiplexing and channel coding (Release 16)", 3GPP TS 38.212 V16.4.0, Dec. 2020, 152 pages.
"3rd Generation Partnership Project; Technical Specification Group Radio Access Network; NR; Physical layer procedures for data (Release 16)", 3GPP TS 38.214 V16.4.0, Dec. 2020, 169 pages.
"3rd Generation Partnership Project; Technical Specification Group Radio Access Network; NR; Physical layer procedures for control (Release 16)", 3GPP TS 38.213 V16.4.0, Dec. 2020, 181 pages.

* cited by examiner

FULL POWER UPLINK TRANSMISSION FOR WIRELESS COMMUNICATION SYSTEMS

CROSS-REFERENCE TO RELATED APPLICATION(S) AND CLAIM OF PRIORITY

The present application claims priority to U.S. Provisional Patent Application No. 63/003,565 filed on Apr. 1, 2020; U.S. Provisional Patent Application No. 63/015,396 filed on Apr. 24, 2020; U.S. Provisional Patent Application No. 63/030,238 filed on May 26, 2020; and U.S. Provisional Patent Application No. 63/030,430 filed on May 27, 2020. The content of the above-identified patent documents is incorporated herein by reference.

TECHNICAL FIELD

The present disclosure relates generally to codebook selection to enable uplink (UL) multiple-input, multiple-output (MIMO) operation for next generation cellular systems.

BACKGROUND

Understanding and correctly estimating the UL channel between a user equipment (UE) and a gNode B (gNB) is important for efficient and effective wireless communication. In order to correctly estimate the UL channel conditions, the UE may transmit reference signal, e.g., SRS, to the gNB for UL channel measurement. With this UL channel measurement, the gNB is able to select appropriate communication parameters to efficiently and effectively perform wireless data communication with the UE in the UL.

SUMMARY

Embodiments of the present disclosure provide methods and apparatuses for codebook selection to enable UL MIMO operation in an advanced wireless communication system.

In one embodiment, a UE for an UL transmission is provided. The UE includes a transceiver configured to receive a configuration information including a full power mode and indicating an UL codebook, wherein: the UL codebook is one of a first codebook and a second codebook, when the full power mode is set to full power mode 1, and the UL codebook is one of the first codebook, the second codebook, and a third codebook, when the full power mode is either not provided or is set to a value other than the full power mode 1. The UE further includes a processor operably connected to the transceiver, the processor configured to identify the UL codebook to use for the UL transmission based on the configuration information. The transceiver is further configured to transmit the UL transmission based on the UL codebook, and wherein the UL codebook for l layers includes $K_l$ full power transmit precoding matrix indicators (TPMIs) and remaining non-full power TPMIs, where a TPMI indicates a N×l UL transmission precoding matrix, N is a number of antenna ports at the UE used for the UL transmission, and l indicates a rank value belonging to $\{1, \ldots, N\}$.

In another embodiment, a base station (BS) is provided. The BS includes a transceiver, and a processor operably connected to the transceiver. The processor is configured to generate configuration information including a full power mode and indicating an UL codebook for a UE to apply to an UL transmission. The transceiver is configured to transmit, to the UE, the configuration information including the full power mode and indicating the UL codebook for the UE to apply to the UL transmission; wherein: the UL codebook is one of a first codebook and a second codebook, when the full power mode is set to full power mode 1, and the UL codebook is one of the first codebook, the second codebook, and a third codebook, when the full power mode is either not provided or is set to a value other than the full power mode 1. The transceiver is further configured to receive, from the UE, the UL transmission based on the UL codebook, wherein the UL codebook for l layers includes $K_l$ full power transmit precoding matrix indicators (TPMIs) and remaining non-full power TPMIs, where a TPMI indicates a N×l UL transmission precoding matrix, N is a number of antenna ports at the UE used for the UL transmission, and l indicates a rank value belonging to $\{1, \ldots, N\}$.

In yet another embodiment, a method for operating a UE for an UL transmission is provided. The method comprises receiving a configuration information including a full power mode and indicating an UL codebook, wherein: the UL codebook is one of a first codebook and a second codebook, when the full power mode is set to full power mode 1, and the UL codebook is one of the first codebook, the second codebook, and a third codebook, when the full power mode is either not provided or is set to a value other than the full power mode 1; identifying the UL codebook to use for the UL transmission based on the configuration information; and transmitting the UL transmission based on the UL codebook wherein the UL codebook for l layers includes $K_l$ full power TPMIs and remaining non-full power TPMIs, where a TPMI indicates a N×l UL transmission precoding matrix, N is a number of antenna ports at the UE used for the UL transmission, and l indicates a rank value belonging to $\{1, \ldots, N\}$.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
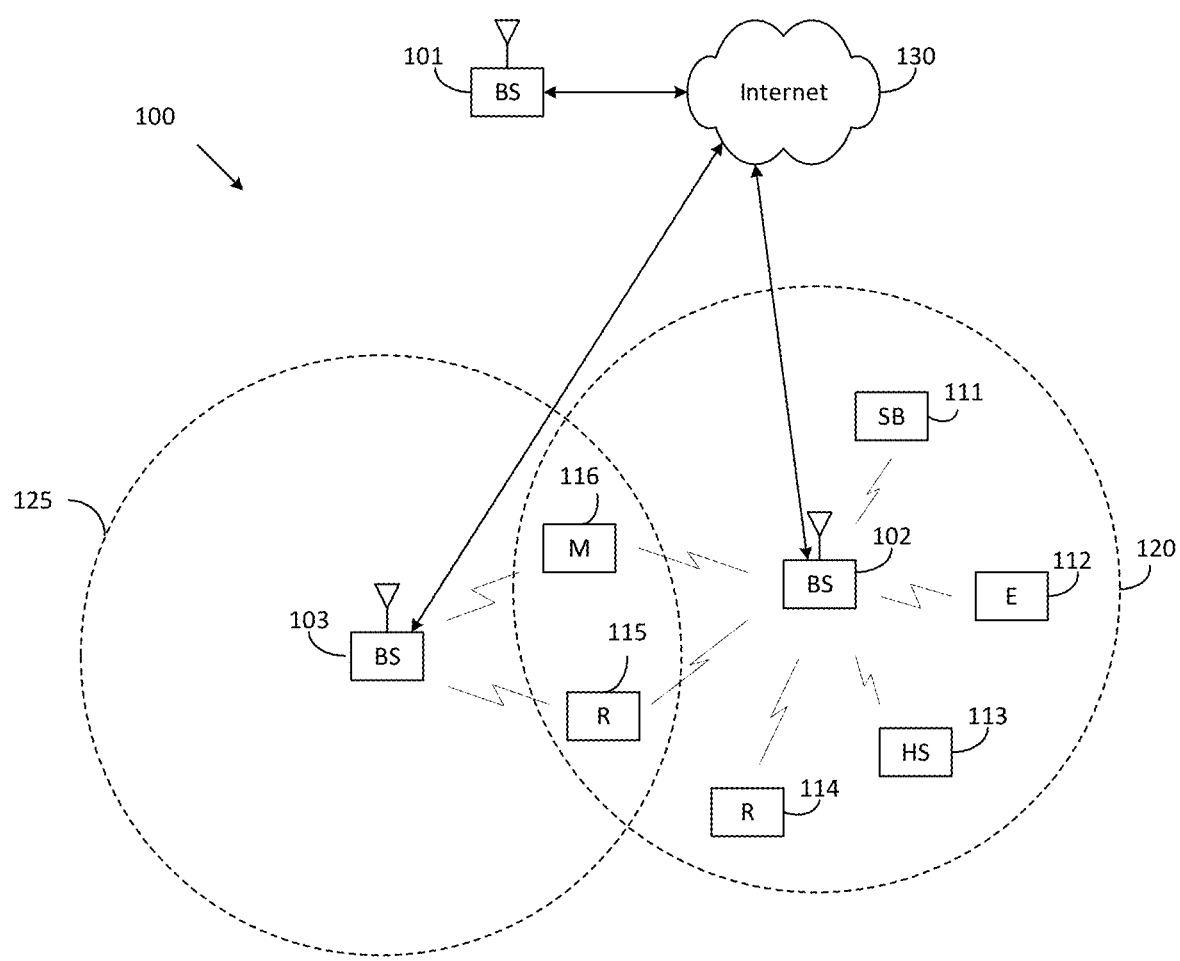
FIG. 1 illustrates an example wireless network according to embodiments of the present disclosure.

FIG. 1 through FIG. 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v16.4.0, "E-UTRA, Physical channels and modulation" (herein "REF 1"); 3GPP TS 36.212 v16.4.0, "E-UTRA, Multiplexing and Channel coding" (herein "REF 2"); 3GPP TS 36.213 v16.4.0, "E-UTRA, Physical Layer Procedures" (herein "REF 3"); 3GPP TS 36.321 v16.3.0, "E-UTRA, Medium Access Control (MAC) protocol specification" (herein "REF 4"); 3GPP TS 36.331 v16.3.0, "E-UTRA, Radio Resource Control (RRC) protocol specification" (herein "REF 5"); 3GPP TR 22.891 v14.2.0 (herein "REF 6"); 3GPP TS 38.211 v16.4.0, "E-UTRA, NR, Physical channels and modulation" (herein "REF 7"); 3GPP TS 38.213 v16.4.0, "E-UTRA, NR, Physical Layer Procedures for control" (herein "REF 8"); 3GPP TS 38.214 v16.4.0, "E-UTRA, NR, Physical layer procedures for data" (herein "REF 9"); and 3GPP TS 38.212 v16.4.0, "E-UTRA, NR, Multiplexing and channel coding" (herein "REF 10").

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), this disclosure can be extended to other OFDM-based transmission waveforms or multiple access schemes such as filtered OFDM (F-OFDM).

The present disclosure covers several components which can be used in conjunction or in combination with one another, or can operate as standalone schemes.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave)

bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
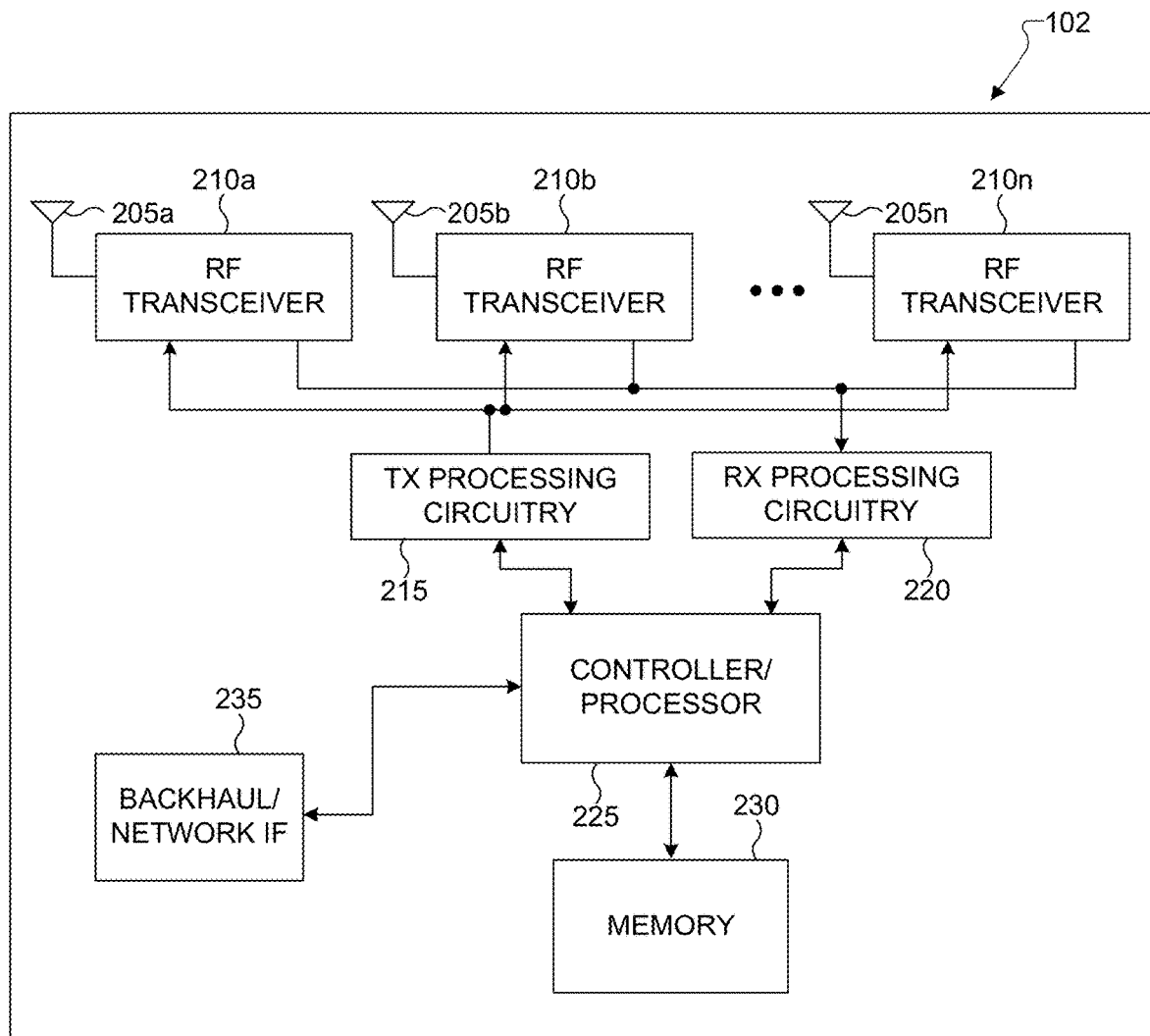
FIG. 2 illustrates an example gNB according to embodiments of the present disclosure.
Figure 3:
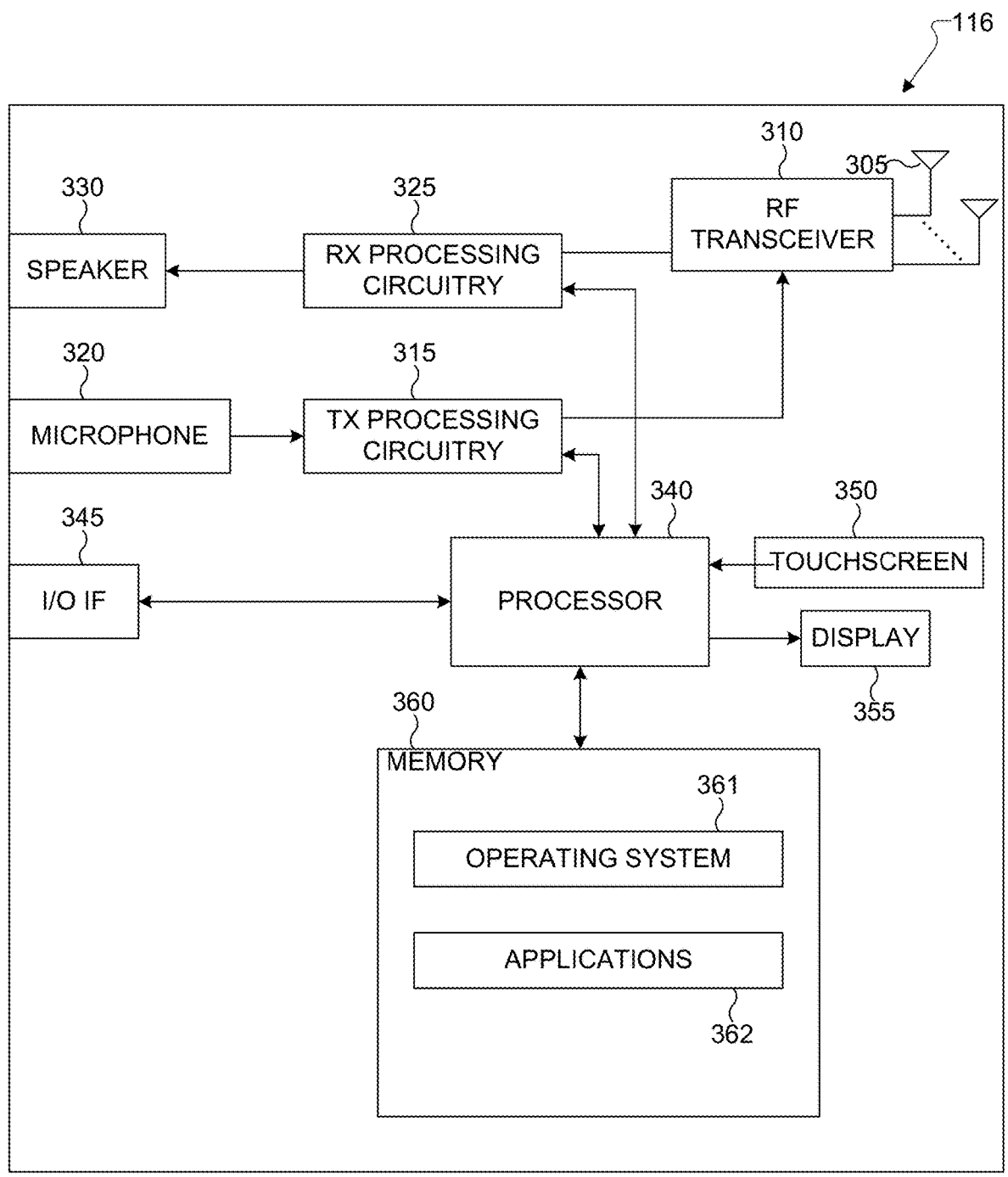
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for an UL transmission based on an UL codebook in an advanced wireless communication system. In certain embodiments, and one or more of the UEs 111-116 includes circuitry, programming, or a combination thereof, for receiving a configuration information including a full power mode and indicating an UL codebook, wherein: the UL codebook is one of a first codebook and a second codebook, when the full power mode is set to full power mode 1, and the UL codebook is one of the first codebook, the second codebook, and a third codebook, when the full power mode is either not provided or is set to a value other than the full power mode 1; identifying the UL codebook to use for the UL transmission based on the configuration information; and transmitting the UL transmission based on the UL codebook wherein the UL codebook for l layers includes $K_l$ full power transmit precoding matrix indicators (TPMIs) and remaining non-full power TPMIs, where a TPMI indicates a N×1 UL transmission precoding matrix, N is a number of antenna ports at the UE used for the UL transmission, and l indicates a rank value belonging to $\{1, \ldots, N\}$. One or more of the gNBs 101-103 includes circuitry, programming, or a combination thereof, for generating configuration information including a full power mode and indicating an uplink (UL) codebook for a user equipment (UE) to apply to an UL transmission; transmitting, to the UE, the configuration information including the full power mode and indicating the UL codebook for the UE to apply to the UL transmission; wherein: the UL codebook is one of a first codebook and a second codebook, when the full power mode is set to full power mode 1, and the UL codebook is one of the first codebook, the second codebook, and a third codebook, when the full power mode is either not provided or is set to a value other than the full power mode 1; and receiving, from the UE, the UL transmission based on the UL codebook, wherein the UL codebook for l layers includes $K_l$ full power transmit precoding matrix indicators (TPMIs) and remaining non-full power TPMIs, where a TPMI indicates a N×l UL transmission precoding matrix, N is a number of antenna ports at the UE used for the UL transmission, and l indicates a rank value belonging to $\{1, \ldots, N\}$.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for receiving a configuration information including a full power mode and indicating an UL codebook, wherein: the UL codebook is one of a first codebook and a second codebook, when the full power mode is set to full power mode 1, and the UL codebook is one of the first codebook, the second codebook, and a third codebook, when the full power mode is either not provided or is set to a value other than the full power mode 1; identifying the UL codebook to use for the UL transmission based on the configuration information; and transmitting the UL transmission based on the UL codebook wherein the UL codebook for l layers includes $K_l$ full power transmit precoding matrix indicators (TPMIs) and remaining non-full power TPMIs, where a TPMI indicates a N×l UL transmission precoding matrix, N is a number of antenna ports at the UE used for the UL transmission, and l indicates a rank value belonging to $\{1, \ldots, N\}$. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
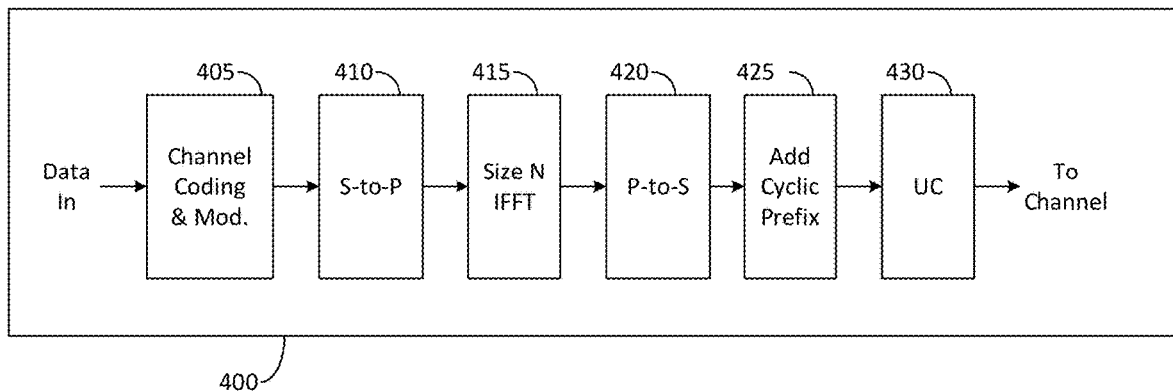
FIG. 4A illustrates a high-level diagram of an orthogonal frequency division multiple access transmit path according to embodiments of the present disclosure.
Figure 4B:
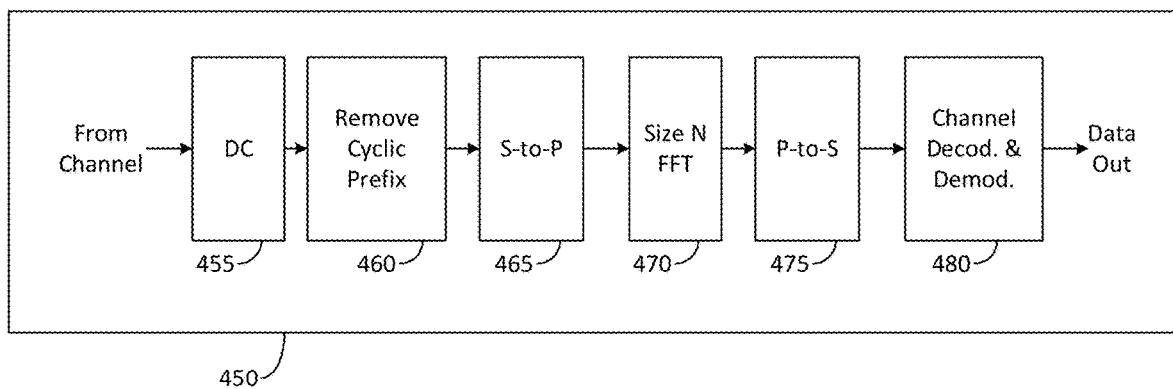
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH}=M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2\cdot(N_{symb}^{UL}-1)-N_{SRS}$, where $N_{SRS}=1$ if a last subframe symbol is used to transmit SRS and $N_{SRS}=0$ otherwise.

Figure 5:
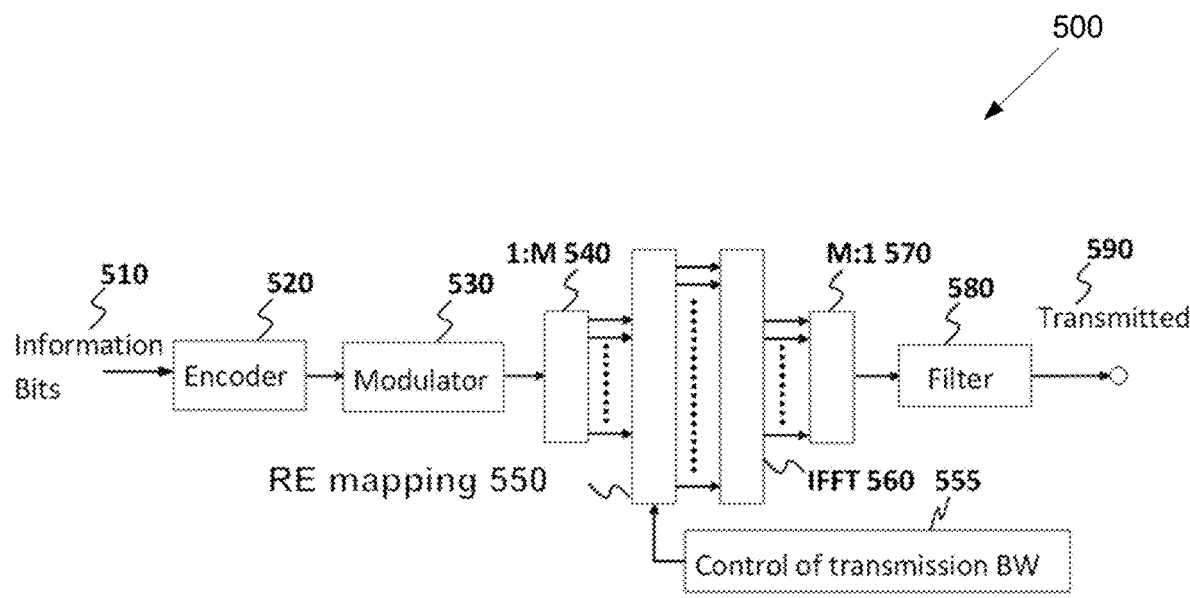
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
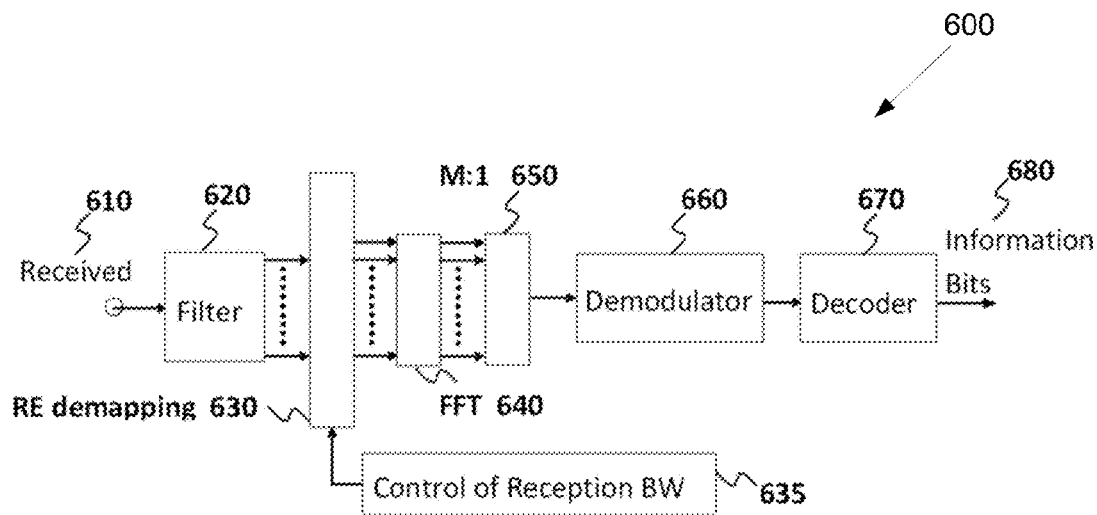
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
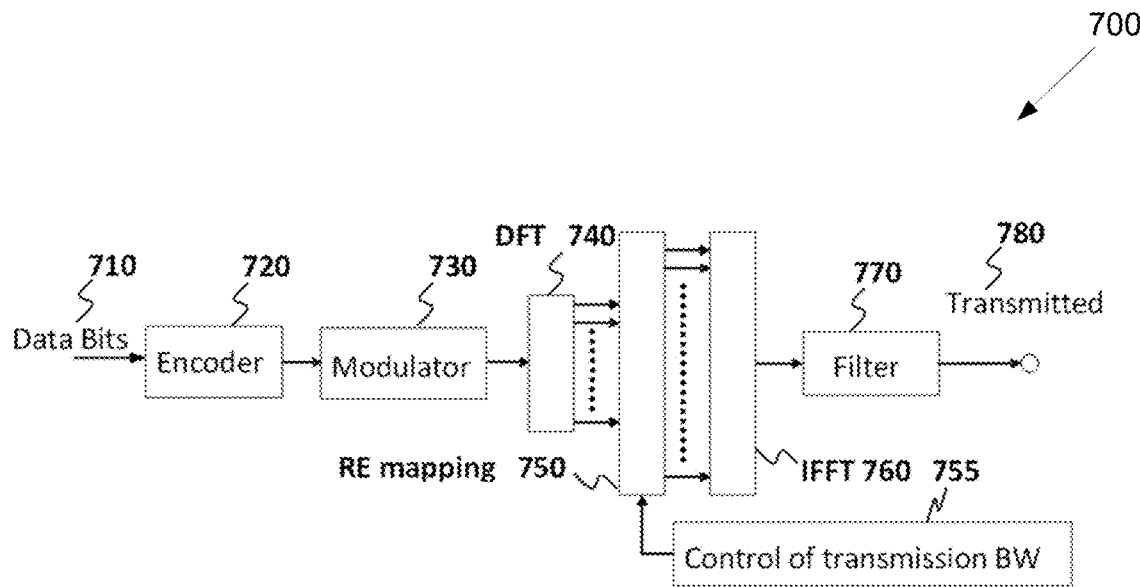
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
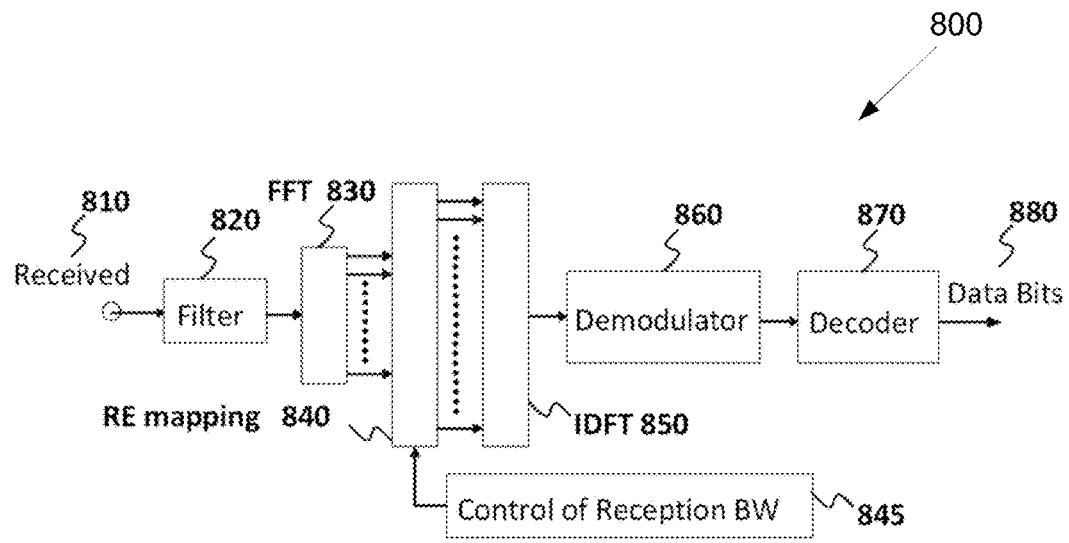
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per km$^2$ with less stringent the reliability, data rate, and latency requirements.

In order for the 5G network to support such diverse services with different quality of services (QoS), one method has been identified in 3GPP specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
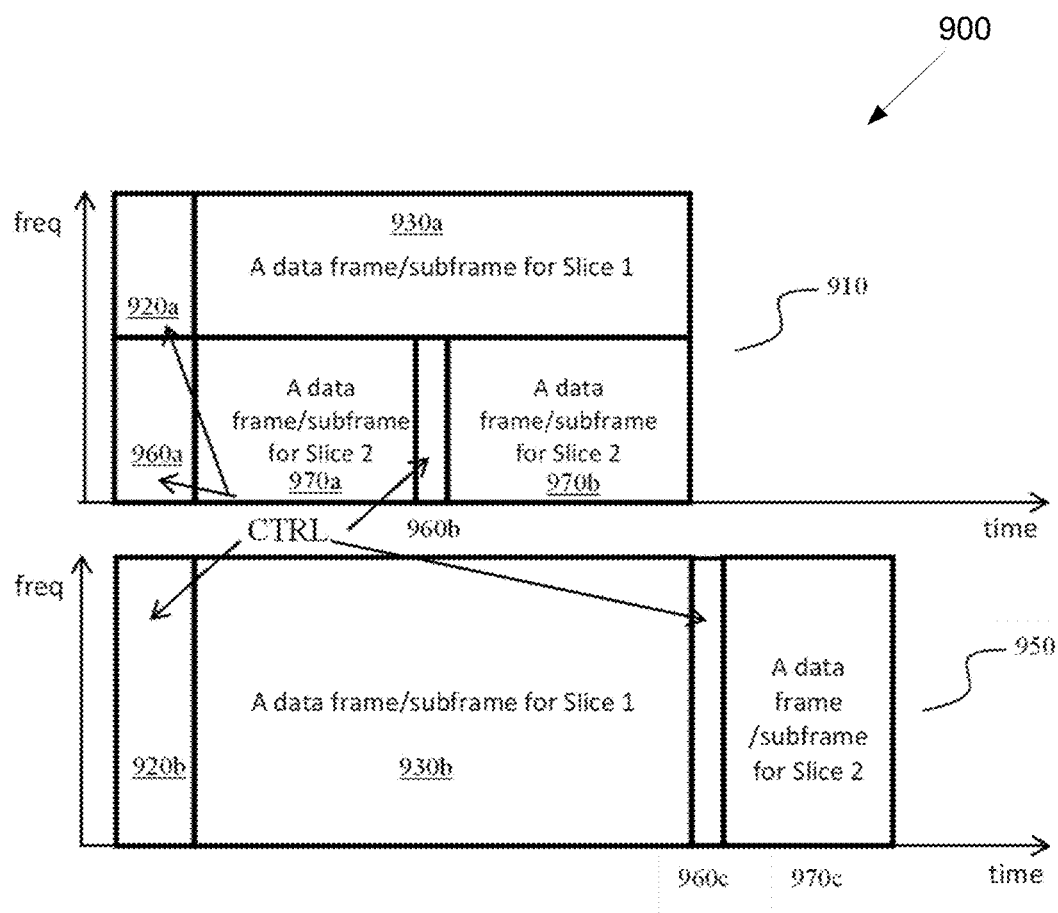
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of this disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920a, 960a, 960b, 920b, or 960c) and a data component (e.g., 930a, 970a, 970b, 930b, or 970c). In embodiment 910, the two slices are multiplexed in frequency domain whereas in embodiment 950, the two slices are multiplexed in time domain. These two slices can be transmitted with different sets of numerology.

3GPP specification supports up to 32 CSI-RS antenna ports which enable a gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
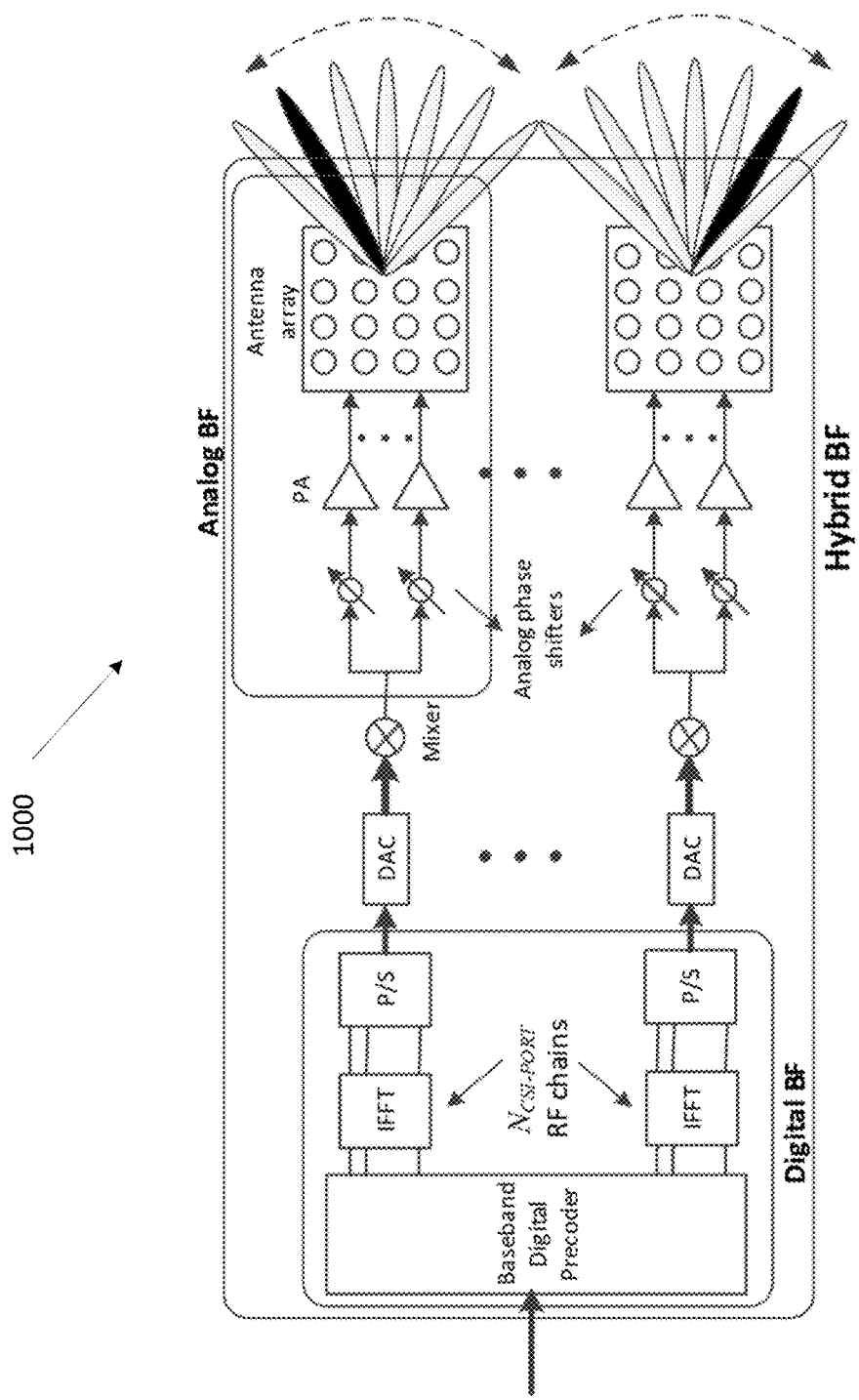
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

Figure 11:
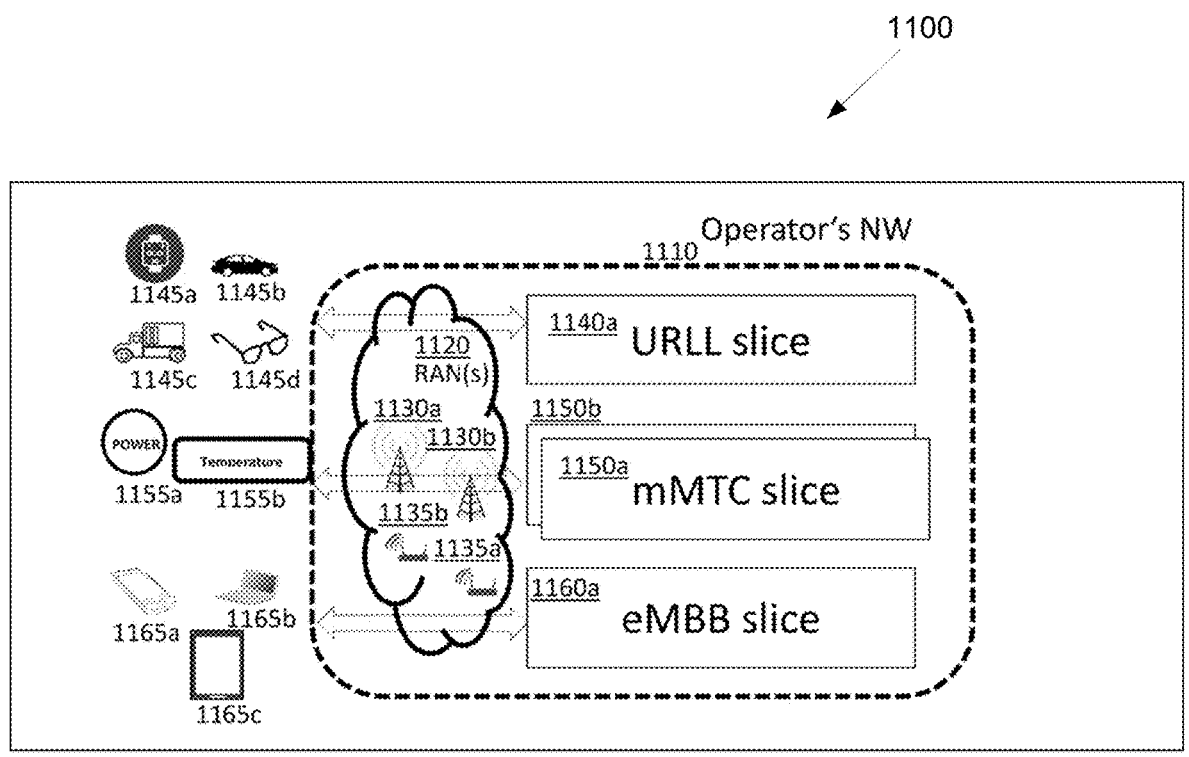
FIG. 11 illustrates an example network configuration according to embodiments of the present disclosure.

FIG. 11 illustrates an example network configuration 1100 according to embodiments of the present disclosure. The embodiment of the network configuration 1100 illustrated in FIG. 11 is for illustration only. FIG. 11 does not limit the scope of this disclosure to any particular implementation of the configuration 1100.

In order for the 5G network to support such diverse services with different quality of services (QoS), one scheme has been identified in 3GPP specification, called network slicing.

As shown in FIG. 11, An operator's network 1110 includes a number of radio access network(s) 1120 (RAN(s)) that are associated with network devices such as gNBs 1130a and 1130b, small cell base stations (femto/pico gNBs or Wi-Fi access points) 1135a and 1135b. The network 1110 can support various services, each represented as a slice.

In the example, an URLL slice 1140a serves UEs requiring URLL services such as cars 1145b, trucks 1145c, smart watches 1145a, and smart glasses 1145d. Two mMTC slices 1150a and 550b serve UEs requiring mMTC services such as power meters 555b, and temperature control box 1155b. One eMBB slice 1160a serves UEs requiring eMBB services such as cells phones 1165a, laptops 1165b, and tablets 1165c. A device configured with two slices can also be envisioned.

To enable digital precoding, efficient design of CSI-RS is a crucial factor. For this reason, three types of CSI reporting mechanism corresponding to three types of CSI-RS measurement behavior are supported, for example, "CLASS A" CSI reporting which corresponds to non-precoded CSI-RS, "CLASS B" reporting with K=1 CSI-RS resource which corresponds to UE-specific beamformed CSI-RS, and "CLASS B" reporting with K>1 CSI-RS resources which corresponds to cell-specific beamformed CSI-RS.

For non-precoded (NP) CSI-RS, a cell-specific one-to-one mapping between CSI-RS port and TXRU is utilized. Different CSI-RS ports have the same wide beam width and direction and hence generally cell wide coverage. For beamformed CSI-RS, beamforming operation, either cell-specific or UE-specific, is applied on a non-zero-power (NZP) CSI-RS resource (e.g., comprising multiple ports). At least at a given time/frequency, CSI-RS ports have narrow beam widths and hence not cell wide coverage, and at least from the gNB perspective. At least some CSI-RS port-resource combinations have different beam directions.

In scenarios where DL long-term channel statistics can be measured through UL signals at a serving eNodeB, UE-specific BF CSI-RS can be readily used. This is typically feasible when UL-DL duplex distance is sufficiently small. When this condition does not hold, however, some UE feedback is necessary for the eNodeB to obtain an estimate of DL long-term channel statistics (or any of representation thereof). To facilitate such a procedure, a first BF CSI-RS transmitted with periodicity T1 (ms) and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

In 3GPP LTE specification, UL SU-MIMO transmission is supported using a codebook-based transmission scheme. That is, an UL grant (containing DCI format 4) includes a single PMI field (along with RI) which indicates the single precoding vector or matrix (from a predefined codebook) a UE shall use for the scheduled UL transmission. Therefore, when multiple PRBs are allocated to the UE, a single precoding matrix indicated by the PMI implies that wideband UL precoding is utilized.

Despite its simplicity, this is clearly sub-optimal since typical UL channel is frequency-selective and a UE is frequency scheduled to transmit using multiple PRBs. Yet another drawback of Rel.10 LTE UL SU-MIMO is its lack of support for scenarios where accurate UL-CSI is unavailable at the eNB (which is essential for properly operating codebook-based transmission). This situation can happen in scenarios with high-mobility UEs or bursty inter-cell interference in cells with poor isolation.

Therefore, there is a need for designing new components to enable more efficient support for UL MIMO for the following reasons. First, the support for frequency-selective (or subband) precoding for UL MIMO is desired whenever possible. Second, UL MIMO should offer competitive performance even when accurate UL-CSI is unavailable at the eNB. Third, the proposed UL MIMO solution should be able to exploit UL-DL reciprocity where CSI-RS is utilized by the UE to provide UL-CSI estimation for TDD scenarios. Additional examples of such efficient UL MIMO operations and components are described in U.S. patent application Ser. No. 15/491,927, filed Apr. 19, 2017 and entitled "Method and Apparatus for Enabling Uplink MIMO," which is incorporated by reference herein in its entirety.

In 3GPP LTE UL codebook, pre-coders with antenna selection has been supported in order to keep peak-to-average power ratio (PAPR) low and cubic-metric (CM) for rank>1 small. Antenna selection offers performance improvement in some scenarios, especially for SC-FDMA based UL in LTE. However, for 5G NR systems, it has been agreed in 3GPP RAN1 that UL is primarily going to be CP-OFDM based, although SC-FDMA based will also be supported. It is unclear that antenna selection will show any performance gain in case of CP-OFDM based UL. Whether antenna selection is considered or not, there are several alternatives for UL codebook in 5G NR. In addition, the UL codebook design is also dependent on whether or not the UE is capable to transmit UL data (PUSCH) using all of, or a subset of antenna ports. For example, the UE can be capable of at least one of full-coherent (all antenna ports), partial-coherent (a subset of antenna ports), or non-coherent UL transmission (a single antenna port) to transmit a layer in UL. The 5G NR UL codebook has been designed keeping this UE coherence capability in mind. However, if there are some issues (as explained later) with UL power control if UL power control similar to LTE is applied. This disclosure addresses a few example embodiments for the UL power control to overcome these issues.

In 3GPP NR, the UL transmission is configured to be either codebook-based or non-codebook-based via higher layer parameter txConfig in PUSCH-Config set to either "codebook" or "nonCodebook."

According to 3GPP NR specification, the following is supported for codebook based UL transmission. For codebook based transmission, the UE determines the UE's codebook subsets based on TPMI and upon the reception of higher layer parameter ULCodebookSubset or codebook-Subset in PUSCH-Config which may be configured with "fullAndPartialAndNonCoherent," or "partialAndNonCoherent," or "nonCoherent" depending on the UE capability. The maximum transmission rank may be configured by the higher parameter ULmaxRank or maxRank in PUSCH-Config.

A UE reporting the UE's UE capability of "partialAnd-NonCoherent" transmission may not expect to be configured by ULCodebookSubset with "fullAndPartialAndNonCoherent."

A UE reporting the UE's UE capability of "Non-Coherent" transmission may not expect to be configured by ULCodebookSubset with "fullAndPartialAndNonCoherent" or with "partialAndNonCoherent."

A UE may not expect to be configured with the higher layer parameter ULCodebookSubset set to "partialAndNonCoherent" when two antenna ports are configured.

In the present disclosure, "fullAndPartialAndNonCoherent," "partialAndNonCoherent," and "Non-Coherent" are referred to as the three examples of coherence type/capability, where the term "coherence" implies a subset of antenna ports at the UE that can be used to transmit a layer of UL data coherently.

According to the NR specification, for non-codebook-based UL transmission, the precoding matrix W equals the identity matrix. For codebook-based UL transmission, the precoding matrix W is given by W=1 for single-layer transmission on a single antenna port, otherwise by TABLE 1 to TABLE 6.

The subset of TPMI indices for the three coherence types are summarized in TABLE 7 and TABLE 8 where rank=r corresponds to (and is equivalent to) r layers.

The rank (or number of layers) and the corresponding precoding matrix W are indicated to the UE using TRI and TPMI, respectively. In one example, this indication is joint via a field "Precoding information and number of layers" in DCI, e.g., using DCI format 0_1. In another example, this indication is via higher layer RRC signaling. In one example, the mapping between a field "Precoding information and number of layers" and TRI/TPMI is according to NR.

TABLE 1

Precoding matrix W for single-layer transmission using two antenna ports

| TPMI index | W (ordered from left to right in increasing order of TPMI index) |
|---|---|
| 0-5 | $\frac{1}{\sqrt{2}}\begin{bmatrix}1\\0\end{bmatrix}$ $\frac{1}{\sqrt{2}}\begin{bmatrix}0\\1\end{bmatrix}$ $\frac{1}{\sqrt{2}}\begin{bmatrix}1\\1\end{bmatrix}$ $\frac{1}{\sqrt{2}}\begin{bmatrix}1\\-1\end{bmatrix}$ $\frac{1}{\sqrt{2}}\begin{bmatrix}1\\j\end{bmatrix}$ $\frac{1}{\sqrt{2}}\begin{bmatrix}1\\-j\end{bmatrix}$ — — |

TABLE 2

Precoding matrix W for single-layer transmission using four antenna ports with transform precoding enabled.

| TPMI index | W (ordered from left to right in increasing order of TPMI index) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ — — — — |

TABLE 3

Precoding matrix W for two-layer transmission using two antenna ports with transform precoding disabled.

| TPMI index | W (ordered from left to right in increasing order of TPMI index) | | |
|---|---|---|---|
| 0-2 | $\frac{1}{\sqrt{2}}\begin{bmatrix} 1 & 0 \\ 0 & 1 \end{bmatrix}$ | $\frac{1}{\sqrt{2}}\begin{bmatrix} 1 & 1 \\ 1 & -1 \end{bmatrix}$ | $\frac{1}{\sqrt{2}}\begin{bmatrix} 1 & 1 \\ j & -j \end{bmatrix}$ |

TABLE 4

Precoding matrix W for two-layer transmission using four antenna ports with transform precoding disabled.

| TPMI index | W (ordered from left to right in increasing order of TPMI index) | | | |
|---|---|---|---|---|
| 0-3 | $\frac{1}{2}\begin{bmatrix} 1 & 0 \\ 0 & 1 \\ 0 & 0 \\ 0 & 0 \end{bmatrix}$ | $\frac{1}{2}\begin{bmatrix} 1 & 0 \\ 0 & 0 \\ 0 & 1 \\ 0 & 0 \end{bmatrix}$ | $\frac{1}{2}\begin{bmatrix} 1 & 0 \\ 0 & 0 \\ 0 & 0 \\ 0 & 1 \end{bmatrix}$ | $\frac{1}{2}\begin{bmatrix} 0 & 0 \\ 1 & 0 \\ 0 & 1 \\ 0 & 0 \end{bmatrix}$ |
| 4-7 | $\frac{1}{2}\begin{bmatrix} 0 & 0 \\ 1 & 0 \\ 0 & 0 \\ 0 & 1 \end{bmatrix}$ | $\frac{1}{2}\begin{bmatrix} 0 & 0 \\ 0 & 0 \\ 1 & 0 \\ 0 & 1 \end{bmatrix}$ | $\frac{1}{2}\begin{bmatrix} 1 & 0 \\ 0 & 1 \\ 1 & 0 \\ 0 & -j \end{bmatrix}$ | $\frac{1}{2}\begin{bmatrix} 1 & 0 \\ 0 & 1 \\ 1 & 0 \\ 0 & j \end{bmatrix}$ |
| 8-11 | $\frac{1}{2}\begin{bmatrix} 1 & 0 \\ 0 & 1 \\ -j & 0 \\ 0 & 1 \end{bmatrix}$ | $\frac{1}{2}\begin{bmatrix} 1 & 0 \\ 0 & 1 \\ -j & 0 \\ 0 & -1 \end{bmatrix}$ | $\frac{1}{2}\begin{bmatrix} 1 & 0 \\ 0 & 1 \\ -1 & 0 \\ 0 & -j \end{bmatrix}$ | $\frac{1}{2}\begin{bmatrix} 1 & 0 \\ 0 & 1 \\ -1 & 0 \\ 0 & j \end{bmatrix}$ |
| 12-15 | $\frac{1}{2}\begin{bmatrix} 1 & 0 \\ 0 & 1 \\ j & 0 \\ 0 & 1 \end{bmatrix}$ | $\frac{1}{2}\begin{bmatrix} 1 & 0 \\ 0 & 1 \\ j & 0 \\ 0 & -1 \end{bmatrix}$ | $\frac{1}{2\sqrt{2}}\begin{bmatrix} 1 & 1 \\ 1 & 1 \\ 1 & -1 \\ 1 & -1 \end{bmatrix}$ | $\frac{1}{2\sqrt{2}}\begin{bmatrix} 1 & 1 \\ 1 & 1 \\ j & -j \\ j & -j \end{bmatrix}$ |
| 16-19 | $\frac{1}{2\sqrt{2}}\begin{bmatrix} 1 & 1 \\ j & j \\ 1 & -1 \\ j & -j \end{bmatrix}$ | $\frac{1}{2\sqrt{2}}\begin{bmatrix} 1 & 1 \\ j & j \\ j & -j \\ -1 & 1 \end{bmatrix}$ | $\frac{1}{2\sqrt{2}}\begin{bmatrix} 1 & 1 \\ -1 & -1 \\ 1 & -1 \\ -1 & 1 \end{bmatrix}$ | $\frac{1}{2\sqrt{2}}\begin{bmatrix} 1 & 1 \\ -1 & -1 \\ j & -j \\ -j & j \end{bmatrix}$ |
| 20-21 | $\frac{1}{2\sqrt{2}}\begin{bmatrix} 1 & 1 \\ -j & -j \\ 1 & -1 \\ -j & j \end{bmatrix}$ | $\frac{1}{2\sqrt{2}}\begin{bmatrix} 1 & 1 \\ -j & -j \\ j & -j \\ 1 & -1 \end{bmatrix}$ | — | — |

TABLE 5

Precoding matrix W for three-layer transmission using four antenna ports with transform precoding disabled.

| TPMI index | W (ordered from left to right in increasing order of TPMI index) | | | |
|---|---|---|---|---|
| 0-3 | $\frac{1}{2}\begin{bmatrix} 1 & 0 & 0 \\ 0 & 1 & 0 \\ 0 & 0 & 1 \\ 0 & 0 & 0 \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ | $\frac{1}{2\sqrt{3}}\begin{bmatrix} 1 & 1 & 1 \\ 1 & -1 & 1 \\ 1 & 1 & -1 \\ 1 & -1 & -1 \end{bmatrix}$ |
| 4-6 | $\frac{1}{2\sqrt{3}}\begin{bmatrix} 1 & 1 & 1 \\ 1 & -1 & 1 \\ j & j & -j \\ j & -j & -j \end{bmatrix}$ | $\frac{1}{2\sqrt{3}}\begin{bmatrix} 1 & 1 & 1 \\ -1 & 1 & -1 \\ 1 & 1 & -1 \\ -1 & 1 & 1 \end{bmatrix}$ | $\frac{1}{2\sqrt{3}}\begin{bmatrix} 1 & 1 & 1 \\ -1 & 1 & -1 \\ j & j & -j \\ -j & j & j \end{bmatrix}$ | — |

TABLE 6

Precoding matrix W for four-layer transmission using four
antenna ports with transform precoding disabled.

| TPMI index | W (ordered from left to right in increasing order of TPMI index) | | | |
|---|---|---|---|---|
| 0-3 | $\frac{1}{2}\begin{bmatrix}1&0&0&0\\0&1&0&0\\0&0&1&0\\0&0&0&1\end{bmatrix}$ | $\frac{1}{2\sqrt{2}}\begin{bmatrix}1&1&0&0\\0&0&1&1\\1&-1&0&0\\0&0&1&-1\end{bmatrix}$ | $\frac{1}{2\sqrt{2}}\begin{bmatrix}1&1&0&0\\0&0&1&1\\j&-j&0&0\\0&0&j&-j\end{bmatrix}$ | $\frac{1}{4}\begin{bmatrix}1&1&1&1\\1&-1&1&-1\\1&1&-1&-1\\1&-1&-1&1\end{bmatrix}$ |
| 4 | $\frac{1}{4}\begin{bmatrix}1&1&1&1\\1&-1&1&-1\\j&j&-j&-j\\j&-j&-j&j\end{bmatrix}$ | — | — | — |

TABLE 7

TPMI indices for 2 antenna ports

| Rank | Non-coherent | fullAndPartialAndNon-Coherent |
|---|---|---|
| 1 | 0-1 | 0-5 |
| 2 | 0 | 0-2 |

TABLE 8

TPMI indices for 4 antenna ports

| Rank | Non-coherent | partialAndNon-Coherent | fullAndPartialAndNon-Coherent |
|---|---|---|---|
| 1 | 0-3 | 0-11 | 0-27 |
| 2 | 0-5 | 0-13 | 0-21 |
| 3 | 0 | 0-2 | 0-6 |
| 4 | 0 | 0-2 | 0-4 |

TABLE 9

Total power of precoding matrix W for 2 antenna ports

| | Non-Coherent TPMIs | | Full-Coherent TPMIs | |
|---|---|---|---|---|
| Rank | TPMI indices | Total power | TPMI indices | Total power |
| 1 | 0-1 | ½ | 2-5 | 1 |
| 2 | 0 | 1 | 1-2 | 1 |

TABLE 10

Total power of precoding matrix W for 4 antenna ports

| | Non-Coherent TPMIs | | Partial-Coherent TPMIs | | Full-Coherent TPMIs | |
|---|---|---|---|---|---|---|
| Rank | TPMI indices | Total power | TPMI indices | Total power | TPMI indices | Total power |
| 1 | 0-3 | ¼ | 4-11 | ½ | 12-27 | 1 |
| 2 | 0-5 | ½ | 6-13 | 1 | 14-21 | 1 |
| 3 | 0 | ¾ | 1-2 | 1 | 3-6 | 1 |
| 4 | 0 | 1 | 1-2 | 1 | 3-4 | 1 |

The total power of the pre-coding matrix W for different rank and coherence types is summarized in TABLE 9 and TABLE 10. The following issues can be observed.

In one issue, for non-coherent and partial-coherent TPMIs, total power increases as rank increases, which implies that the TPMI selection will be biased to higher rank. In particular, even for cell-edge UEs, rank 1 TPMI may not be selected, which can severely affect cell-edge performance.

In another issue, for a given rank, total power of non-coherent TPMIs≤total power of partial-coherent TPMIs≤total power of full-coherent TPMIs. The reason for this trend is that the power of non-zero antenna ports does not change across three types of TPMIs. This may be beneficial in some scenarios, for example, UE implementation for power saving. However, this may not be desired always.

The abovementioned issues can be handled by virtualizing Tx chains (or antenna ports), e.g., a UE can virtualize Tx chains when configured with an SRS resource that has fewer ports than the number of Tx chains.

Figure 12:
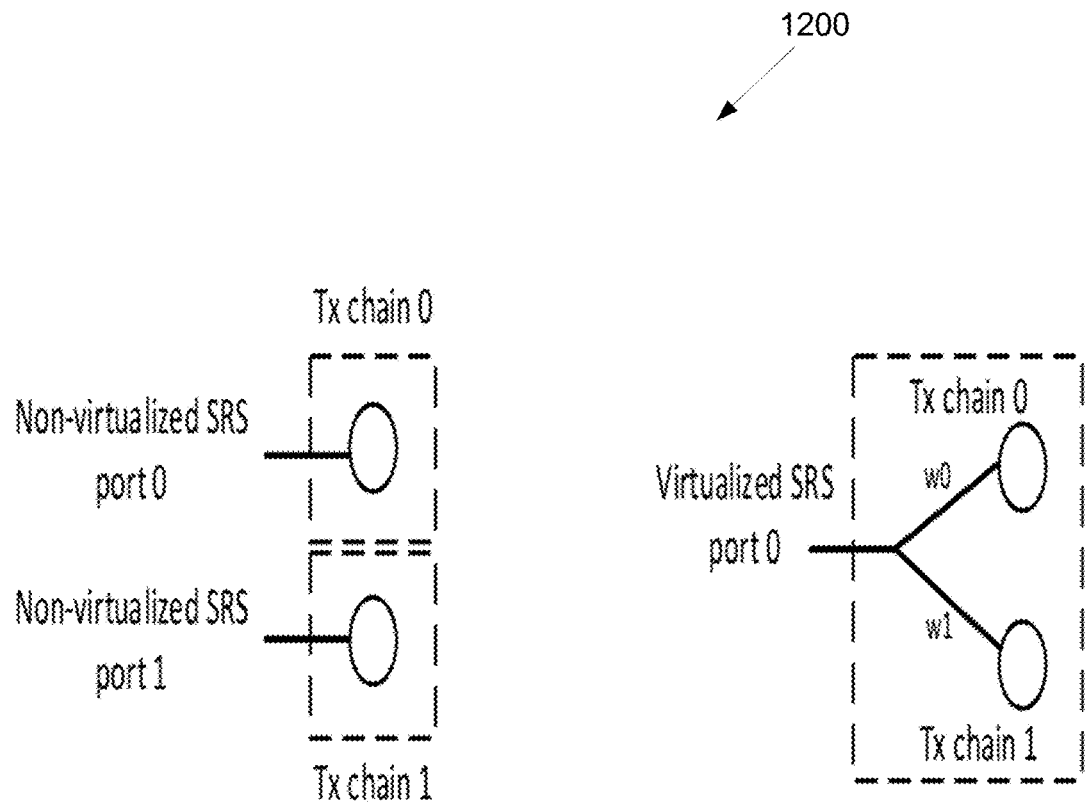
FIG. 12 illustrates an example virtualized SRS port according to embodiments of the present disclosure.

FIG. 12 illustrates an example virtualized SRS port 1200 according to embodiments of the present disclosure. The embodiment of the virtualized SRS port 1200 illustrated in FIG. 12 is for illustration only. FIG. 12 does not limit the scope of this disclosure to any particular implementation of the virtualized SRS port 1200.

As illustrated in FIG. 12, a virtualized SRS port is shown for the UE with two Tx chains, where $w_0$ and $w_1$ are virtualization weights used at the two Tx chains. A few example embodiments are proposed in the disclosure. The scope of the disclosure is not limited to only these embodiments, but includes any extensions or combinations of the proposed embodiments.

In embodiment 1, a UE reports, via UE capability signaling, whether it is capable of full power UL transmission based on "virtualized" SRS transmission. When the UE is capable of full power UL transmission based on "virtualized" SRS transmission, then the UE is configured with at least one of the following two types of SRS resources (either in one SRS resource set or in two different SRS resource sets):

Type 1 (non-virtualized or non-precoded): comprises $K_1$ SRS resources with $N_1$ SRS ports, where $N_1$ equals the number of Tx chains (or antenna ports) at the UE, where $K_1 \geq 1$ Type 2 (virtualized or precoded): comprises $K_2$ SRS resources with $N_2$ SRS ports, where $N_2$ is less than the number of Tx chains (or antenna ports) at the UE, where $K_2 \geq 1$ For the Type 1 SRS resources, the UE does not virtualize (precode) multiple Tx chains (or antenna ports) before transmitting SRS resources from them. For the Type 2 SRS resources, on the other hand, the UE virtualizes (precodes) multiple Tx chains (or antenna ports) to obtain $N_2$ SRS ports before transmitting SRS resources from them. The virtualization weight (or precoding vector) is either transparent (not known at the gNB) or is reported by the UE to the gNB or is configured by the gNB (e.g., via TPMI together with SRS configuration). Here, the virtualization refers to assigning (using) non-zero weights to multiple Tx chains and combing the weighted Tx chains to form a single "virtualized" SRS port (or virtualized Tx chain). In one example, for the Type 2 SRS resources, the UE may be further configured with CSI-RS resources (e.g., via associated-CSIRS configuration) to link the virtualized SRS resources with CSI-RS resources, where the CSI-RS resources are measured by the UE to obtain virtualization weights (precoding vectors) to virtualize the corresponding Type 2 SRS resources.

In one example, $N_1 \in \{2,4\}$. In one example, $N_2=1$ is fixed. In one example, $N_2 \in \{1,2\}$. In one example, $N_2 \in \{1,2,3\}$. In one example, $N_2 \in \{1,2,3,4\}$. In one example, $N_2 \in \{1,2,4\}$. In one example, $N_2 \in \{1, \ldots, N_1\}$.

In one example, when $K_2>1$, then the number of SRS ports ($N_2$) in each Type 2 SRS resource is the same. In another example, when $K_2>1$, then the number of SRS ports ($N_2$) in different Type 2 SRS resources can be different.

The UE transmits Type 1 and/or 2 SRS resources according to the SRS configuration received from the gNB. The gNB measures the corresponding SRS ports and calculates SRI/TPMI, and indicates the calculated SRI/TPMI to the UE (e.g. via DCI or higher layer RRC signaling). The UE uses SRI/TPMI to select a SRS resource and corresponding SRS ports (with non-zero power) for UL (PUSCH) transmission. The PUSCH power (via UL power control) is scaled by a factor $$\beta = \frac{\rho_0}{\rho},$$

where $\rho_0$=number of SRS ports with non-zero power, and $\rho$=number of SRS ports in SRS resource indicated by SRI.

A few embodiments, which are variations or examples of embodiment 1, are as follows.

In embodiment 1A, a UE reports, via UE capability signaling, whether it is capable of full power UL transmission based on "virtualized" SRS transmission. When the UE is capable of full power UL transmission based on "virtualized" SRS transmission, then the UE is configured with only one of the two types of SRS resources (e.g., in one SRS resource set), i.e., either Type 1 or Type 2, not both. When configured with Type 1 SRS resources, the UE transmits SRS resource without any virtualization. When configured with Type 2 SRS resources, the UE transmits SRS resource with virtualization (as explained in embodiment 1). The gNB measures the SRS ports and indicates SRI/TPMI to the UE for UL transmission. In one example, the type of SRS is configured via higher layer RRC signaling. In another example, the type of SRS is configured via MAC CE based signaling. In another example, the type of SRS is configured via DCI.

Embodiments on 2Tx, Rank 1 Virtualized

In embodiment 1B, when the number of Tx chains (or antenna ports) at the UE is 2, then the UE is configured with two types of SRS resources (either in one SRS resource set or in two different SRS resource sets):

Type 1 (non-virtualized or non-precoded): comprises $K_1$ SRS resources with $N_1=2$ SRS ports, where $K_1 \geq 0$ Type 2 (virtualized or precoded): comprises $K_2$ SRS resources with $N_2=1$ SRS port, where $K_2 \geq 0$.

Here, at least one of $K_1$ and $K_2$ is greater than 1, i.e., $K_1=K_2=0$ is not possible. The UE transmits Type 1 and/or 2 SRS resources (with or without virtualization as explained in embodiment 1). The gNB measures these SRS resources, and indicates SRI to the UE. When the SRI indicates a Type 1 SRS resource, then TPMI corresponding to rank 1 or 2 (or rank 1 to ULmaxRank where ULmaxRank is RRC configured) transmission is also indicated. When the SRI indicates a Type 2 SRS resource, then there is no TPMI indication, and the selected resource indicates a port for rank 1 transmission. At least one of the following examples is used for $K_1$ and $K_2$.

Ex 1B-0: $K_2=0$, $K_1=1$
Ex 1B-1: $K_2=1$, $K_1=0$
Ex 1B-2: $K_2=1$, $K_1=1$
Ex 1B-3: $K_2=1$, $K_1 \geq 1$
Ex 1B-4: $K_2=1$, $K_1>1$
Ex 1B-5: $K_2 \geq 1$, $K_1=1$
Ex 1B-6: $K_2>1$, $K_1=1$
Ex 1B-7: $K_2 \geq 1$, $K_1 \geq 1$
Ex 1B-8: $K_2>1$, $K_1 \geq 1$
Ex 1B-9: $K_2 \geq 1$, $K_1>1$
Ex 1B-10: $K_2>1$, $K_1>1$ The SRI reporting is according to at least one of the following alternatives.

Alt 1B-0: a joint SRI is used to select (a) one of the two types of SRS resources, and (b) a SRS resource within the selected type of SRS resources. In one example, this requires a $\lceil \log_2(K_1+K_2) \rceil$-bit indication.

Alt 1B-1: two separate SRIs, (SRI1, SRI2), are used, where SRI1 is used to select one of the two types of SRS resources, and SRI2 is used to indicate a SRS resource within the selected type of SRS resources. In one example, SRI1 requires a 1-bit indication, and SRI2 requires a $\lceil \log_2 K_1 \rceil$-bit indication if SRI1 indicates Type 1 SRS resources, and a $\lceil \log_2 K_2 \rceil$-bit indication if SRI1 indicates Type 2 SRS resources.

Note that, when $K_1=K_2=1$, then the two alternatives are equivalent since SRI2 is not indicated (not needed). Note also that, when $K_1=1$ and SRI1 indicates Type 1 SRS resources, then SRI2 is not indicated. Likewise, when $K_2=1$ and SRI1 indicates Type 2 SRS resources, then SRI2 is not indicated. In one example, SRI1 is indicated/configured via higher layer RRC signaling. In another example, SRI1 is indicated/configured via MAC CE based signaling. In another example, SRI1 is indicated/configured via DCI.

Embodiments on 2Tx, Rank 1-2 Virtualized

In embodiment 1C, when the number of Tx chains (or antenna ports) at the UE is 2, then the UE is configured with two types of SRS resources (either in one SRS resource set or in two different SRS resource sets):

Type 1 (non-virtualized or non-precoded): comprises $K_1$ SRS resources with $N_1=2$ SRS ports, where $K_1 \geq 0$ Type 2 (virtualized or precoded): comprises $K_2$ SRS resources with $N_2=1$ SRS port, where $K_2 \geq 0$.

Here, at least one of $K_1$ and $K_2$ is greater than 1, i.e., $K_1=K_2=0$ is not possible. The UE transmits Type 1 and/or 2 SRS resources (with or without virtualization as explained in embodiment 1). The gNB measures these SRS resources, and indicates SRI to the UE. When the SRI indicates a Type 1 SRS resource, then TPMI corresponding to rank 1 or 2 transmission is also indicated. When the SRI indicates Type 2 SRS, then there is no TPMI indication, and the SRI either selects a single SRS resource indicating a port for rank 1 transmission or two SRS resources indicating two ports for rank 2 transmission (assuming identity precoding, i.e., 1 layer per port). At least one of the examples (1B-0 through 1B-10) is used for $K_1$ and $K_2$. The SRI reporting is according to at least one of the following alternatives.

Alt 1C-0: a joint SRI is used to select either (a) a type 1 SRS resource, or (b) a single Type 2 SRS resource or (c) two Type 2 SRS resources. In one example, this requires a $$\left\lceil \log_2\left(K_1 + K_2 + \binom{K_2}{2}\right) \right\rceil \text{ - bit indication.}$$

Alt 1C-1: two separate SRIs, (SRI1, SRI2), are used, where SRI1 is used to select one of the two types of SRS resources, and SRI2 is used to indicate SRS resource(s) within the selected type of SRS resources. In one example, SRI1 requires a 1-bit indication, and SRI2 requires a $\lceil \log_2 K_1 \rceil$-bit indication if SRI1 indicates Type 1 SRS resources, and a $$\left\lceil \log_2\left(K_2 + \binom{K_2}{2}\right) \right\rceil \text{ - bit indication}$$

if SRI1 indicates Type 2 SRS resources.

Note that, when $K_1=K_2=1$, then the two alternatives are equivalent since SRI2 is not indicated (not needed). Note also that, when $K_1=1$ and SRI1 indicates Type 1 SRS resources, then SRI2 is not indicated. Likewise, when $K_2=1$ and SRI1 indicates Type 2 SRS resources, then SRI2 is not indicated. In one example, SRI1 is indicated/configured via higher layer RRC signaling. In another example, SRI1 is indicated/configured via MAC CE based signaling. In another example, SRI1 is indicated/configured via DCI.

In embodiment 1D, when the number of Tx chains (or antenna ports) at the UE is 2, then the UE is configured with two types of SRS resources (either in one SRS resource set or in two different SRS resource sets):

Type 1 (non-virtualized or non-precoded): comprises $K_1$ SRS resources with $N_1=2$ SRS ports, where $K_1 \geq 0$ Type 2 (virtualized or precoded): comprises $K_2$ SRS resources with $N_2=1$ SRS port, where $K_2 \geq 0$.

Here, at least one of $K_1$ and $K_2$ is greater than 1, i.e., $K_1=K_2=0$ is not possible. The UE transmits Type 1 and/or 2 SRS resources (with or without virtualization as explained in embodiment 1). The gNB measures these SRS resources, and indicates SRI to the UE. When the SRI indicates a Type 1 SRS resource, then TPMI corresponding to rank 1 or 2 transmission is also indicated. When the SRI indicates a single Type 2 SRS resource, then there is no TPMI indication, and the single SRS resource indicates a port for rank 1 transmission. When the SRI indicates two Type 2 SRS resources, then there is TPMI indication, and two SRS resources indicates two ports for at least one of the following transmission ranks (i) rank 1 only transmission (via rank 1 TPMIs), (ii) rank 2 only transmission (via rank 2 TPMIs), (iii) for rank 1 or 2 transmission (via rank 1-2 TPMIs).

At least one of the examples (1B-0 through 1B-10) is used for $K_1$ and $K_2$. The SRI reporting is according to at least one of the following alternatives.

Alt 1D-0: a joint SRI is used to select either (a) a type 1 SRS resource, or (b) a single Type 2 SRS resource or (c) two Type 2 SRS resources. In one example, this requires a $$\left\lceil \log_2\left(K_1 + K_2 + \binom{K_2}{2}\right) \right\rceil \text{ - bit indication.}$$

Alt 1D-1: two separate SRIs, (SRI1, SRI2), are used, where SRI1 is used to select one of the two types of SRS resources, and SRI2 is used to indicate SRS resource(s) within the selected type of SRS resources. In one example, SRI1 requires a 1-bit indication, and SRI2 requires a $\lceil \log_2 K_1 \rceil$-bit indication if SRI1 indicates Type 1 SRS resources, and a $$\left\lceil \log_2\left(K_2 + \binom{K_2}{2}\right) \right\rceil \text{ - bit indication}$$

if SRI1 indicates Type 2 SRS resources.

Note that, when $K_1=K_2=1$, then the two alternatives are equivalent since SRI2 is not indicated (not needed). Note also that, when $K_1=1$ and SRI1 indicates Type 1 SRS resources, then SRI2 is not indicated. Likewise, when $K_2=1$ and SRI1 indicates Type 2 SRS resources, then SRI2 is not indicated. In one example, SRI1 is indicated/configured via higher layer RRC signaling. In another example, SRI1 is indicated/configured via MAC CE based signaling. In another example, SRI1 is indicated/configured via DCI.

In embodiment 1E, when the number of Tx chains (or antenna ports) at the UE is 2, then the UE is configured with two types of SRS resources (either in one SRS resource set or in two different SRS resource sets):

Type 1 (non-virtualized or non-precoded): comprises $K_1$ SRS resources with $N_1=2$ SRS ports, where $K_1 \geq 0$ Type 2 (virtualized or precoded): comprises $K_2$ SRS resources with $N_2=1$ SRS port, where $K_2 \geq 0$.

Here, at least one of $K_1$ and $K_2$ is greater than 1, i.e., $K_1=K_2=0$ is not possible. The UE transmits Type 1 and/or 2 SRS resources (with or without virtualization as explained in embodiment 1). The gNB measures these SRS resources, and indicates SRI to the UE. When the SRI indicates a Type 1 SRS resource, then TPMI corresponding to rank 1 or 2 transmission is also indicated. When the SRI indicates a single Type 2 SRS resource, then there is no TPMI indication, and the single SRS resource indicates a port for rank 1 transmission. When the SRI indicates two Type 2 SRS resources, then either (a) there is TPMI indication (indicating identity precoding), and two SRS resources indicates two ports for rank 2 transmission (assuming identity precoding, i.e., 1 layer per port) or (b) there is TPMI indication (indicating non-identity precoding), and two SRS resources indicates two ports for at least one of the following transmission ranks (i) rank 1 only transmission (via rank 1 TPMIs), (ii) rank 2 only transmission (via rank 2 TPMIs), (iii) for rank 1 or 2 transmission (via rank 1-2 TPMIs).

At least one of the examples (1B-0 through 1B-10) is used for $K_1$ and $K_2$. The SRI reporting is according to at least one of the following alternatives.

Alt 1E-0: a joint SRI is used to select either (a) a type 1 SRS resource, or (b) a single Type 2 SRS resource or (c) two Type 2 SRS resources. In one example, this requires a $$\left\lceil \log_2\left(K_1 + K_2 + \binom{K_2}{2}\right) \right\rceil \text{ - bit indication.}$$

Alt 1E-1: two separate SRIs, (SRI1, SRI2), are used, where SRI1 is used to select one of the two types of SRS resources, and SRI2 is used to indicate SRS resource(s) within the selected type of SRS resources. In one example, SRI1 requires a 1-bit indication, and SRI2 requires a $\lceil \log_2 K_1 \rceil$-bit indication if SRI1 indicates Type 1 SRS resources, and a $$\left\lceil \log_2\left(K_2 + \binom{K_2}{2}\right)\right\rceil \text{-bit indication}$$

if SRI1 indicates Type 2 SRS resources.

Note that, when $K_1=K_2=1$, then the two alternatives are equivalent since SRI2 is not indicated (not needed). Note also that, when $K_1=1$ and SRI1 indicates Type 1 SRS resources, then SRI2 is not indicated. Likewise, when $K_2=1$ and SRI1 indicates Type 2 SRS resources, then SRI2 is not indicated. In one example, SRI1 is indicated/configured via higher layer RRC signaling. In another example, SRI1 is indicated/configured via MAC CE based signaling. In another example, SRI1 is indicated/configured via DCI.

Embodiments on 4Tx, Rank 1 Virtualized

In embodiment 1F, when the number of Tx chains (or antenna ports) at the UE is 4, then the UE is configured with two types of SRS resources (either in one SRS resource set or in two different SRS resource sets):

Type 1 (non-virtualized or non-precoded): comprises $K_1$ SRS resources with $N_1=4$ SRS ports, where $K_1 \geq 0$ Type 2 (virtualized or precoded): comprises $K_2$ SRS resources with $N_2=1$ SRS port, where $K_2 \geq 0$.

Here, at least one of $K_1$ and $K_2$ is greater than 1, i.e., $K_1=K_2=0$ is not possible. The UE transmits Type 1 and/or 2 SRS resources (with or without virtualization as explained in embodiment 1). The gNB measures these SRS resources, and indicates SRI to the UE. When the SRI indicates a Type 1 SRS resource, then TPMI corresponding to rank 1 or 2 or 3 or 4 (or rank 1 to ULmaxRank where ULmaxRank is RRC configured) transmission is also indicated. When the SRI indicates a Type 2 SRS resource, then there is no TPMI indication, and the selected resource indicates a port for rank 1 transmission. At least one of the examples (1B-0 through 1B-10) is used for $K_1$ and $K_2$. The SRI reporting is according at least one of Alt 1B-0 and Alt 1B-1. The rest of the details about SRI indication is the same as in embodiment 1B.

Embodiments on 4Tx, Rank 1-2 Virtualized

In embodiment 1G, when the number of Tx chains (or antenna ports) at the UE is 4, then the UE is configured with two types of SRS resources (either in one SRS resource set or in two different SRS resource sets):

Type 1 (non-virtualized or non-precoded): comprises $K_1$ SRS resources with $N_1=4$ SRS ports, where $K_1 \geq 0$ Type 2 (virtualized or precoded): comprises $K_2$ SRS resources with $N_2=1$ SRS port, where $K_2 \geq 0$.

Here, at least one of $K_1$ and $K_2$ is greater than 1, i.e., $K_1=K_2=0$ is not possible. The UE transmits Type 1 and/or 2 SRS resources (with or without virtualization as explained in embodiment 1). The gNB measures these SRS resources, and indicates SRI to the UE. When the SRI indicates a Type 1 SRS resource, then TPMI corresponding to rank 1 or 2 or 3 or 4 transmission is also indicated. When the SRI indicates Type 2 SRS, then there is no TPMI indication, and the SRI either selects a single SRS resource indicating a port for rank 1 transmission or two SRS resources indicating two ports for rank 2 transmission (assuming identity precoding, i.e., 1 layer per port). At least one of the examples (1B-0 through 1B-10) is used for $K_1$ and $K_2$. The SRI reporting is according at least one of Alt 1C-0 and Alt 1C-1. The rest of the details about SRI indication is the same as in embodiment 1C.

In embodiment 1H, when the number of Tx chains (or antenna ports) at the UE is 4, then the UE is configured with two types of SRS resources (either in one SRS resource set or in two different SRS resource sets):

Type 1 (non-virtualized or non-precoded): comprises $K_1$ SRS resources with $N_1=4$ SRS ports, where $K_1 \geq 0$ Type 2 (virtualized or precoded): comprises $K_2$ SRS resources with $N_2=1$ SRS port, where $K_2 \geq 0$.

Here, at least one of $K_1$ and $K_2$ is greater than 1, i.e., $K_1=K_2=0$ is not possible. The UE transmits Type 1 and/or 2 SRS resources (with or without virtualization as explained in embodiment 1). The gNB measures these SRS resources, and indicates SRI to the UE. When the SRI indicates a Type 1 SRS resource, then TPMI corresponding to rank 1 or 2 or 3 or 4 transmission is also indicated. When the SRI indicates a single Type 2 SRS resource, then there is no TPMI indication, and the single SRS resource indicates a port for rank 1 transmission. When the SRI indicates two Type 2 SRS resources, then there is TPMI indication, and two SRS resources indicates two ports for at least one of the following transmission ranks (i) rank 1 only transmission (via rank 1 TPMIs), (ii) rank 2 only transmission (via rank 2 TPMIs), (iii) for rank 1 or 2 transmission (via rank 1-2 TPMIs). At least one of the examples (1B-0 through 1B-10) is used for $K_1$ and $K_2$. The SRI reporting is according at least one of Alt 1D-0 and Alt 1D-1. The rest of the details about SRI indication is the same as in embodiment 1D.

In embodiment 11, when the number of Tx chains (or antenna ports) at the UE is 4, then the UE is configured with two types of SRS resources (either in one SRS resource set or in two different SRS resource sets):

Type 1 (non-virtualized or non-precoded): comprises $K_1$ SRS resources with $N_1=4$ SRS ports, where $K_1 \geq 0$ Type 2 (virtualized or precoded): comprises $K_2$ SRS resources with $N_2=1$ SRS port, where $K_2 \geq 0$.

Here, at least one of $K_1$ and $K_2$ is greater than 1, i.e., $K_1=K_2=0$ is not possible. The UE transmits Type 1 and/or 2 SRS resources (with or without virtualization as explained in embodiment 1). The gNB measures these SRS resources, and indicates SRI to the UE. When the SRI indicates a Type 1 SRS resource, then TPMI corresponding to rank 1 or 2 or 3 or 4 transmission is also indicated. When the SRI indicates a single Type 2 SRS resource, then there is no TPMI indication, and the single SRS resource indicates a port for rank 1 transmission. When the SRI indicates two Type 2 SRS resources, then either (a) there is TPMI indication (indicating identity precoding), and two SRS resources indicates two ports for rank 2 transmission (assuming identity precoding, i.e., 1 layer per port) or (b) there is TPMI indication (indicating non-identity precoding), and two SRS resources indicates two ports for at least one of the following transmission ranks (i) rank 1 only transmission (via rank 1 TPMIs), (ii) rank 2 only transmission (via rank 2 TPMIs), (iii) for rank 1 or 2 transmission (via rank 1-2 TPMIs). At least one of the examples (1B-0 through 1B-10) is used for $K_1$ and $K_2$. The SRI reporting is according at least one of Alt 1F-0 and Alt 1F-1. The rest of the details about SRI indication is the same as in embodiment 1F.

Embodiments on 4Tx, Rank 1-3 Virtualized

In embodiment 1J, when the number of Tx chains (or antenna ports) at the UE is 4, then the UE is configured with two types of SRS resources (either in one SRS resource set or in two different SRS resource sets):

Type 1 (non-virtualized or non-precoded): comprises $K_1$ SRS resources with $N_1=4$ SRS ports, where $K_1 \geq 0$ Type 2 (virtualized or precoded): comprises $K_2$ SRS resources with $N_2=1$ SRS port, where $K_2 \geq 0$.

Here, at least one of $K_1$ and $K_2$ is greater than 1, i.e., $K_1=K_2=0$ is not possible. The UE transmits Type 1 and/or 2 SRS resources (with or without virtualization as explained in embodiment 1). The gNB measures these SRS resources, and indicates SRI to the UE. When the SRI indicates a Type 1 SRS resource, then TPMI corresponding to rank 1 or 2 or 3 or 4 transmission is also indicated. When the SRI indicates Type 2 SRS, then there is no TPMI indication, and the SRI either selects a single SRS resource indicating a port for rank 1 transmission or two SRS resources indicating two ports for rank 2 transmission (assuming identity precoding, i.e., 1 layer per port) or three SRS resources indicating three ports for rank 3 transmission (assuming identity precoding, i.e., 1 layer per port). At least one of the examples (1B-0 through 1B-10) is used for $K_1$ and $K_2$. The SRI reporting is according to at least one of the following alternatives.

Alt 1J-0: a joint SRI is used to select either (a) a type 1 SRS resource, or (b) a single Type 2 SRS resource or (c) two Type 2 SRS resources or (d) three Type 2 SRS resources. In one example, this requires a $$\left\lceil \log_2\left(K_1 + K_2 + \binom{K_2}{2} + \binom{K_2}{3}\right)\right\rceil - \text{bit indication.}$$

Alt 1J-1: two separate SRIs, (SRI1, SRI2), are used, where SRI1 is used to select one of the two types of SRS resources, and SRI2 is used to indicate SRS resource(s) within the selected type of SRS resources. In one example, SRI1 requires a 1-bit indication, and SRI2 requires a $\lceil \log_2 K_1 \rceil$-bit indication if SRI1 indicates Type 1 SRS resources, and a $$\left\lceil \log_2\left(K_2 + \binom{K_2}{2} + \binom{K_2}{3}\right)\right\rceil - \text{bit indication}$$

if SRI1 indicates Type 2 SRS resources.

The rest of the details about SRI indication is the same as in embodiment 1C.

In embodiment 1K, when the number of Tx chains (or antenna ports) at the UE is 4, then the UE is configured with two types of SRS resources (either in one SRS resource set or in two different SRS resource sets):

Type 1 (non-virtualized or non-precoded): comprises $K_1$ SRS resources with $N_1=4$ SRS ports, where $K_1 \geq 0$ Type 2 (virtualized or precoded): comprises $K_2$ SRS resources with $N_2=1$ SRS port, where $K_2 \geq 0$.

Here, at least one of $K_1$ and $K_2$ is greater than 1, i.e., $K_1=K_2=0$ is not possible. The UE transmits Type 1 and/or 2 SRS resources (with or without virtualization as explained in embodiment 1). The gNB measures these SRS resources, and indicates SRI to the UE. When the SRI indicates a Type 1 SRS resource, then TPMI corresponding to rank 1 or 2 or 3 or 4 transmission is also indicated.

When the SRI indicates a single Type 2 SRS resource, then there is no TPMI indication, and the single SRS resource indicates a port for rank 1 transmission.

When the SRI indicates two Type 2 SRS resources, then there is TPMI indication, and two SRS resources indicates two ports for at least one of the following transmission ranks (i) rank 1 only transmission (via rank 1 TPMIs), (ii) rank 2 only transmission (via rank 2 TPMIs), (iii) for rank 1 or 2 transmission (via rank 1-2 TPMIs).

When the SRI indicates three Type 2 SRS resources, then there is TPMI indication, and three SRS resources indicates three ports for at least one of the following transmission ranks (i) rank 1 only transmission (via rank 1 TPMIs), (ii) rank 2 only transmission (via rank 2 TPMIs), (iii) rank 3 only transmission (via rank 3 TPMIs) or (iv) for rank 1 or 2 or 3 transmission (via rank 1-3 TPMIs).

The rest of the details about SRI indication is the same as in embodiment 1D.

In embodiment 1L, when the number of Tx chains (or antenna ports) at the UE is 4, then the UE is configured with two types of SRS resources (either in one SRS resource set or in two different SRS resource sets):

Type 1 (non-virtualized or non-precoded): comprises $K_1$ SRS resources with $N_1=4$ SRS ports, where $K_1 \geq 0$ Type 2 (virtualized or precoded): comprises $K_2$ SRS resources with $N_2=1$ SRS port, where $K_2 \geq 0$.

Here, at least one of $K_1$ and $K_2$ is greater than 1, i.e., $K_1=K_2=0$ is not possible. The UE transmits Type 1 and/or 2 SRS resources (with or without virtualization as explained in embodiment 1). The gNB measures these SRS resources, and indicates SRI to the UE. When the SRI indicates a Type 1 SRS resource, then TPMI corresponding to rank 1 or 2 or 3 or 4 transmission is also indicated.

When the SRI indicates a single Type 2 SRS resource, then there is no TPMI indication, and the single SRS resource indicates a port for rank 1 transmission.

When the SRI indicates two Type 2 SRS resources, then either (a) there is TPMI indication (indicating identity precoding), and two SRS resources indicates two ports for rank 2 transmission (assuming identity precoding, i.e., 1 layer per port) or (b) there is TPMI indication (indicating non-identity precoding), and two SRS resources indicates two ports for at least one of the following transmission ranks (i) rank 1 only transmission (via rank 1 TPMIs), (ii) rank 2 only transmission (via rank 2 TPMIs), (iii) for rank 1 or 2 transmission (via rank 1-2 TPMIs).

When the SRI indicates three Type 2 SRS resources, then either (a) there is TPMI indication (indicating identity precoding), and three SRS resources indicates three ports for rank 2 transmission (assuming identity precoding, i.e., 1 layer per port) or (b) there is TPMI indication (indicating non-identity precoding), and three SRS resources indicates three ports for at least one of the following transmission ranks (i) rank 1 only transmission (via rank 1 TPMIs), (ii) rank 2 only transmission (via rank 2 TPMIs), (iii) rank 3 only transmission (via rank 3 TPMIs) or (iv) for rank 1 or 2 or 3 transmission (via rank 1-3 TPMIs).

The rest of the details about SRI indication is the same as in embodiment 1F.

Embodiments on 4Tx, Different #SRS Ports in Type 2 SRS

In embodiment 1M, when the number of Tx chains (or antenna ports) at the UE is 4, then the UE is configured with two types of SRS resources (either in one SRS resource set or in two different SRS resource sets):

Type 1 (non-virtualized or non-precoded): comprises $K_1$ SRS resources with $N_1=4$ SRS ports, where $K_1 \geq 0$ Type 2 (virtualized or precoded): comprises $K_2$ SRS resources, where $K_2=K_{21}+K_{22}$, divided into sub-types Type 2a: $K_{21}$ SRS resources with $N_2=1$ SRS port.

Type 2b: $K_{22}$ SRS resources with $N_2=2$ SRS ports.

Here, at least one of $K_1$, $K_{21}$, and $K_{22}$ is greater than 1, i.e., $K_1=K_{21}=K_{22}=0$ is not possible. The UE transmits Type 1 and/or 2 SRS resources (with or without virtualization as explained in embodiment 1). The gNB measures these SRS resources, and indicates SRI to the UE.

When the SRI indicates a Type 1 SRS resource, then TPMI corresponding to rank 1 or 2 or 3 or 4 transmission is also indicated.

When the SRI indicates Type 2a SRS, then there is no TPMI indication, and the SRI selects a single SRS resource indicating a port for rank 1 transmission.

When the SRI indicates Type 2b SRS, the SRI selects two SRS resources indicating two ports for rank 2 transmission. At least one of the following alternatives is used for TPMI in this case.

In one alternatives, there is no TPMI indication for rank 2 transmission. In this alternative, the UE assumes a fixed precoding matrix, e.g. identity precoding matrix.

In one alternatives, there is TPMI indication for rank 2 transmission.

Note that for Type 2 SRS resources, rank=number of SRS ports in the selected SRS resource. The SRI reporting is according to at least one of the following alternatives.

Alt 1M-0: a joint SRI is used to select (a) one of the two types of SRS resources, and (b) a SRS resource within the selected type of SRS resources. In one example, this requires a $\lceil \log_2(K_1+K_2) \rceil$-bit indication.

Alt 1M-1: two separate SRIs, (SRI1, SRI2), are used, where SRI1 is used to select one of the two types of SRS resources, and SRI2 is used to indicate a SRS resource within the selected type of SRS resources. In one example, SRI1 requires a 1-bit indication, and SRI2 requires a $\lceil \log_2 K_1 \rceil$-bit indication if SRI1 indicates Type 1 SRS resources, and a $\lceil \log_2 K_2 \rceil$-bit indication if SRI1 indicates Type 2 SRS resources.

Alt 1M-2: two separate SRIs, (SRI1, SRI2), are used, where SRI1 is used to select one of the two types/sub-types of SRS resources, and SRI2 is used to indicate a SRS resource within the selected type/sub-type of SRS resources. In one example, SRI1 requires a 2-bit indication, and SRI2 requires a $\lceil \log_2 K_1 \rceil$-bit indication if SRI1 indicates Type 1 SRS resources, a $\lceil \log_2 K_{21} \rceil$-bit indication if SRI1 indicates Type 2a SRS resources and a $\lceil \log_2 K_{22} \rceil$-bit indication if SRI1 indicates Type 2b SRS resources.

The rest of the details about SRI indication is the same as in embodiment 1C.

In embodiment 1N, when the number of Tx chains (or antenna ports) at the UE is 4, then the UE is configured with two types of SRS resources (either in one SRS resource set or in two different SRS resource sets):

Type 1 (non-virtualized or non-precoded): comprises $K_1$ SRS resources with $N_1=4$ SRS ports, where $K_1 \geq 0$ Type 2 (virtualized or precoded): comprises $K_2$ SRS resources, where $K_2=K_{21}+K_{22}+K_{23}$, divided into sub-types Type 2a: $K_{21}$ SRS resources with $N_2=1$ SRS port.
Type 2b: $K_{22}$ SRS resources with $N_2=2$ SRS ports.
Type 2c: $K_{23}$ SRS resources with $N_2=3$ SRS ports.

Here, at least one of $K_1$, $K_{21}$, $K_{22}$ and $K_{23}$ is greater than 1, i.e., $K_1=K_{21}=K_{22}=K_{23}=0$ is not possible. The UE transmits Type 1 and/or 2 SRS resources (with or without virtualization as explained in embodiment 1). The gNB measures these SRS resources, and indicates SRI to the UE.

When the SRI indicates a Type 1 SRS resource, then TPMI corresponding to rank 1 or 2 or 3 or 4 transmission is also indicated.

When the SRI indicates Type 2a SRS, then there is no TPMI indication, and the SRI selects a single SRS resource indicating a port for rank 1 transmission.

When the SRI indicates Type 2b SRS, the SRI selects two SRS resources indicating two ports for rank 2 transmission. At least one of the following alternatives is used for TPMI in this case.

In one alternatives, there is no TPMI indication for rank 2 transmission. In this alternative, the UE assumes a fixed precoding matrix, e.g. identity precoding matrix.

In one alternatives, there is TPMI indication for rank 2 transmission.

When the SRI indicates Type 2c SRS, the SRI selects three SRS resources indicating three ports for rank 3 transmission. At least one of the following alternatives is used for TPMI in this case.

In one alternatives, there is no TPMI indication for rank 3 transmission. In this alternative, the UE assumes a fixed precoding matrix, e.g. identity precoding matrix.

In one alternatives, there is TPMI indication for rank 3 transmission.

Note that for Type 2 SRS resources, rank=number of SRS ports in the selected SRS resource. The SRI reporting is according to at least one of the following alternatives.

Alt 1M-0: a joint SRI is used to select (a) one of the two types of SRS resources, and (b) a SRS resource within the selected type of SRS resources. In one example, this requires a $\lceil \log_2(K_1+K_2) \rceil$-bit indication.

Alt 1M-1: two separate SRIs, (SRI1, SRI2), are used, where SRI1 is used to select one of the two types of SRS resources, and SRI2 is used to indicate a SRS resource within the selected type of SRS resources. In one example, SRI1 requires a 1-bit indication, and SRI2 requires a $\lceil \log_2 K_1 \rceil$-bit indication if SRI1 indicates Type 1 SRS resources, and a $\lceil \log_2 K_2 \rceil$-bit indication if SRI1 indicates Type 2 SRS resources.

Alt 1M-2: two separate SRIs, (SRI1, SRI2), are used, where SRI1 is used to select one of the two types/sub-types of SRS resources, and SRI2 is used to indicate a SRS resource within the selected type/sub-type of SRS resources. In one example, SRI1 requires a 2-bit indication, and SRI2 requires a $\lceil \log_2 K_1 \rceil$-bit indication if SRI1 indicates Type 1 SRS resources, a $\lceil \log_2 K_{21} \rceil$-bit indication if SRI1 indicates Type 2a SRS resources, a $\lceil \log_2 K_{22} \rceil$-bit indication if SRI1 indicates Type 2b SRS resources, and a $\lceil \log_2 K_{23} \rceil$-bit indication if SRI1 indicates Type 2c SRS resources.

The rest of the details about SRI indication is the same as in embodiment 1C.

In a variation of this embodiment, Type 1 SRS resources can also be virtualized or precoded. Likewise, Type 2 SRS resources can also be non-virtualized or non-precoded.

In one example, the full power UL transmission according to some embodiments of this disclosure is referred to as Mode 2. The UE reports via its capability signaling whether it can support full power UL transmission according to Mode 2. If the UE is capable to support full power UL transmission according to Mode 2, then the gNB or network (NW) can configure the full power UL transmission to the UE via higher layer signaling of parameter ulFPTx or ulFPTxModes set to Mode 2.

In embodiment 2, when the UE is configured with codebook-based UL transmission (e.g., via higher layer parameter txConfig codebook) and also configured with full power UL transmission according to some embodiments of this disclosure (e.g., via higher layer parameter ulFPTx or ulFPTxModes Mode 2), the indication/configuration of SRI (indicating one out of multiple SRS resources) and TRI/TPMI (e.g. via parameter Precoding information and number of layers) is according to at least one of the following alternatives.

In one alternative Alt 2-1, when the UE is configured with multiple SRS resources (Type 1 and/or 2), then SRI is indicated/configured via higher layer signaling, and TRI/TPMI is indicated/configured via DCI (e.g. NR DCI format 0_1). Note that the TRI/TPMI size (number of bit or payload) depends on the number of SRS ports associated with the indicated SRS resource. For instance, the payload for a 4-port SRS resource is larger than that for a 2-port SRS resource. However, since SRI is indicated via higher layer signaling, the TRI/TPMI size in DCI is fixed once the UE receives the RRC configuration.

In one alternative Alt 2-1A, when the UE is configured with multiple SRS resources (Type 1 and/or 2), then the number of SRS ports (X) associated with the SRS resource (indicated via SRI in DCI) is indicated/configured via higher layer signaling, and both SRI and TRI/TPMI are indicated/configured via DCI (e.g. NR DCI format 0_1). The SRI is indicated via DCI only if there are multiple SRS resources with X number of SRS ports.

In one alternative Alt 2-2, when the UE is configured with multiple SRS resources (Type 1 and/or 2), then SRI is indicated/configured via MAC CE based signaling, and TRI/TPMI is indicated/configured via DCI (e.g. NR DCI format 0_1). Note that the TRI/TPMI size (number of bit or payload) depends on the number of SRS ports associated with the indicated SRS resource. For instance, the payload for a 4-port SRS resource is larger than that for a 2-port SRS resource. However, since SRI is indicated via MAC CE based signaling, the TRI/TPMI size in DCI is fixed once the UE receives the MAC CE signaling.

In one alternative Alt 2-2A, when the UE is configured with multiple SRS resources (Type 1 and/or 2), then the number of SRS ports (X) associated with the SRS resource (indicated via SRI in DCI) is indicated/configured via MAC CE based signaling, and both SRI and TRI/TPMI are indicated/configured via DCI (e.g. NR DCI format 0_1). The SRI is indicated via DCI only if there are multiple SRS resources with X number of SRS ports.

In one alternative Alt 2-3, when the UE is configured with multiple SRS resources (Type 1 and/or 2), then both SRI and TRI/TPMI are indicated/configured via DCI (e.g. NR DCI format 0_1). Since TRI/TPMI size (number of bit or payload) can vary depending on the number of SRS ports associated with the multiple SRS resources, the DCI payload may be ambiguous. To avoid this ambiguity, the TRI/TPMI size can be fixed to the maximum (or largest) TRI/TPMI size, where the maximum is across all SRS resources. In one example, this maximum corresponds to the SRS resource with the maximum number of SRS ports.

In one alternative Alt 2-4, when the UE is configured with multiple SRS resources (Type 1 and/or 2), then both SRI and TRI/TPMI are indicated/configured jointly via a single filed in DCI (e.g. NR DCI format 01).

In one alternative Alt 2-5, when the UE is configured with multiple SRS resources (Type 1 and/or 2) with the same number of SRS ports, then the SRI is indicated/configured via DCI (e.g. via NR DCI format 01). When the UE is configured with multiple SRS resources with at least two SRS resources with different number of SRS ports, then the SRI is indicated/configured via higher layer (e.g. RRC) signaling, or alternatively, via MAC CE based signaling. The TRI/TPMI indication is via DCI.

In embodiment 3, the UE is always configured with $K=K_1+K_2 \geq 2$ SRS resources for full power UL transmission according to some embodiments of this disclosure, where either (a) $K_1 \geq 1$ and $K_2 \geq 1$ or (b) $K_1=0$, $K_2 \geq 2$ and there are at least 2 (Type 2) SRS resources with different number of SRS ports. In one example, $K \in \{2,4\}$. In one example, $K=2$ for 2 antenna ports at the UE and $K \in \{2,4\}$ for 4 antenna ports at the UE. Note that there needs to be at least two SRS resources (out of the K SRS resources) with different number of SRS ports. The number of SRS ports in each of the K SRS resources is according to at least one of the following alternatives.

In one alternative Alt 3-1, the number of SRS ports in each of the K SRS resources belongs to $\{1,2,3,4\}$. In particular, for 2 antenna ports at the UE, the number of SRS ports in each of the K SRS resources belongs to $\{1,2\}$, and for 4 antenna ports at the UE, the number of SRS ports in each of the K SRS resources belongs to $\{1,2,3,4\}$.

An example of all possible SRS resource combinations for 2 antenna ports at the UE and K=2 is shown in Table 11.

An example of all possible SRS resource combinations for 2 antenna ports at the UE and K=3 is shown in Table 12. In one example, the UE can be configured with any of the SRS resource combinations from Table 12. In another example, the UE can only be configured with a fixed SRS resource combination. An example of the fixed SRS resource combination is SRS resource combination index=0.

An example of all possible SRS resource combinations for 2 antenna ports at the UE and K=4 is shown in Table 13. In one example, the UE can be configured with any of the SRS resource combinations from Table 13. In another example, the UE can only be configured with a fixed SRS resource combination. An example of the fixed SRS resource combination is SRS resource combination index=0. In another example, the UE can only be configured with a SRS resource combination from a subset of the all SRS resource combination in Table 13. In one example, this subset corresponds to SRS resource combination indices 0-1.

TABLE 11

| SRS resource combinations for 2 antenna ports and K = 2 | | |
| --- | --- | --- |
| SRS resource combination index | Number of 1-port SRS resource(s) | Number of 2-port SRS resource(s) |
| 0 | 1 | 1 |

TABLE 12

| SRS resource combinations for 2 antenna ports and K = 3 | | |
| --- | --- | --- |
| SRS resource combination index | Number of 1-port SRS resource(s) | Number of 2-port SRS resource(s) |
| 0 | 2 | 1 |
| 1 | 1 | 2 |

TABLE 13

SRS resource combinations for 2 antenna ports and K = 4

| SRS resource combination index | Number of 1-port SRS resource(s) | Number of 2-port SRS resource(s) |
|---|---|---|
| 0 | 3 | 1 |
| 1 | 2 | 2 |
| 2 | 1 | 3 |

An example of all possible SRS resource combinations for 4 antenna ports at the UE and K=2 is shown in Table 14. In one example, the UE can be configured with any of the SRS resource combinations from Table 14. In another example, the UE can only be configured with a fixed SRS resource combination. An example of the fixed SRS resource combination is SRS resource combination index=2. In another example, the UE can only be configured with a SRS resource combination from a subset of the all SRS resource combination in Table 14. In one example, this subset corresponds to SRS resource combination indices 0-2.

TABLE 14

SRS resource combinations for 4 antenna ports and K = 2

| SRS resource combination index | Number of 1-port SRS resource(s) | Number of 2-port SRS resource(s) | Number of 3-port SRS resource(s) | Number of 4-port SRS resource(s) |
|---|---|---|---|---|
| 0 | 1 | 1 | 0 | 0 |
| 1 | 1 | 0 | 1 | 0 |
| 2 | 1 | 0 | 0 | 1 |
| 3 | 0 | 1 | 1 | 0 |
| 4 | 0 | 1 | 0 | 1 |
| 5 | 0 | 0 | 1 | 1 |

An example of all possible SRS resource combinations for 4 antenna ports at the UE and K=3 is shown in Table 15. In one example, the UE can be configured with any of the SRS resource combinations from Table 15. In another example, the UE can only be configured with a fixed SRS resource combination. An example of the fixed SRS resource combination is SRS resource combination index=1. In another example, the UE can only be configured with a SRS resource combination from a subset of the all SRS resource combination in Table 15. In one example, this subset corresponds to SRS resource combination indices 0-3.

TABLE 15

SRS resource combinations for 4 antenna ports and K = 3

| SRS resource combination index | Number of 1-port SRS resource(s) | Number of 2-port SRS resource(s) | Number of 3-port SRS resource(s) | Number of 4-port SRS resource(s) |
|---|---|---|---|---|
| 0 | 1 | 1 | 1 | 0 |
| 1 | 1 | 1 | 0 | 1 |
| 2 | 1 | 0 | 1 | 1 |
| 3 | 0 | 1 | 1 | 1 |
| 4 | 2 | 1 | 0 | 0 |
| 5 | 2 | 0 | 1 | 0 |
| 6 | 2 | 0 | 0 | 1 |
| 7 | 1 | 2 | 0 | 0 |
| 8 | 0 | 2 | 1 | 0 |
| 9 | 0 | 2 | 0 | 1 |
| 10 | 1 | 0 | 2 | 0 |
| 11 | 0 | 1 | 2 | 0 |
| 12 | 0 | 0 | 2 | 1 |
| 13 | 1 | 0 | 0 | 2 |
| 14 | 0 | 1 | 0 | 2 |
| 15 | 0 | 0 | 1 | 2 |

An example of all possible SRS resource combinations for 4 antenna ports at the UE and K=4 is shown in Table 16. In one example, the UE can be configured with any of the SRS resource combinations from Table 16. In another example, the UE can only be configured with a fixed SRS resource combination. An example of the fixed SRS resource combination is SRS resource combination index=0. In another example, the UE can only be configured with a SRS resource combination from a subset of the all SRS resource combination in Table 16. In one example, this subset corresponds to SRS resource combination indices 0-12.

TABLE 16

SRS resource combinations for 4 antenna ports and K = 4

| SRS resource combination index | Number of 1-port SRS resource(s) | Number of 2-port SRS resource(s) | Number of 3-port SRS resource(s) | Number of 4-port SRS resource(s) |
|---|---|---|---|---|
| 0 | 1 | 1 | 1 | 1 |
| 1 | 2 | 1 | 1 | 0 |
| 2 | 2 | 1 | 0 | 1 |
| 3 | 2 | 0 | 1 | 1 |
| 4 | 1 | 2 | 1 | 0 |
| 5 | 1 | 2 | 0 | 1 |
| 6 | 0 | 2 | 1 | 1 |
| 7 | 1 | 1 | 2 | 0 |
| 8 | 1 | 0 | 2 | 1 |
| 9 | 0 | 1 | 2 | 1 |
| 10 | 1 | 1 | 0 | 2 |
| 11 | 1 | 0 | 1 | 2 |
| 12 | 0 | 1 | 1 | 2 |
| 13 | 3 | 1 | 0 | 0 |
| 14 | 3 | 0 | 1 | 0 |
| 15 | 3 | 0 | 0 | 1 |
| 16 | 1 | 3 | 0 | 0 |
| 17 | 0 | 3 | 1 | 0 |
| 18 | 0 | 3 | 0 | 1 |
| 19 | 1 | 0 | 3 | 0 |
| 20 | 0 | 1 | 3 | 0 |
| 21 | 0 | 0 | 3 | 1 |
| 22 | 1 | 0 | 0 | 3 |
| 23 | 0 | 1 | 0 | 3 |
| 24 | 0 | 0 | 1 | 3 |
| 25 | 2 | 2 | 0 | 0 |
| 26 | 2 | 0 | 2 | 0 |
| 27 | 2 | 0 | 0 | 2 |
| 28 | 0 | 2 | 2 | 0 |
| 29 | 0 | 2 | 0 | 2 |
| 30 | 0 | 0 | 2 | 2 |

In one alternative Alt 3-2, the number of SRS ports in each of the K SRS resources belongs to {1,2,4}. In particular, for 2 antenna ports at the UE, the number of SRS ports in each of the K SRS resources belongs to {1,2}, and for 4 antenna ports at the UE, the number of SRS ports in each of the K SRS resources belongs to {1,2,4}.

An example of all possible SRS resource combinations for 4 antenna ports at the UE and K=2 is shown in Table 17. In one example, the UE can be configured with any of the SRS resource combinations from Table 17. In another example, the UE can only be configured with a fixed SRS resource combination. An example of the fixed SRS resource combination is SRS resource combination index=1. In another example, the UE can only be configured with a SRS resource combination from a subset of the all SRS resource combination in Table 17. In one example, this subset corresponds to SRS resource combination indices 0-1.

TABLE 17

SRS resource combinations for 4 antenna ports and K = 2

| SRS resource combination index | Number of 1-port SRS resource(s) | Number of 2-port SRS resource(s) | Number of 4-port SRS resource(s) |
|---|---|---|---|
| 0 | 1 | 1 | 0 |
| 1 | 1 | 0 | 1 |
| 2 | 0 | 1 | 1 |

An example of all possible SRS resource combinations for 4 antenna ports at the UE and K=3 is shown in Table 18. In one example, the UE can be configured with any of the SRS resource combinations from Table 18. In another example, the UE can only be configured with a fixed SRS resource combination. An example of the fixed SRS resource combination is SRS resource combination index=0. In another example, the UE can only be configured with a SRS resource combination from a subset of the all SRS resource combination in Table 18. In one example, this subset corresponds to SRS resource combination indices 0-1.

TABLE 18

SRS resource combinations for 4 antenna ports and K = 3

| SRS resource combination index | Number of 1-port SRS resource(s) | Number of 2-port SRS resource(s) | Number of 4-port SRS resource(s) |
|---|---|---|---|
| 0 | 1 | 1 | 1 |
| 1 | 2 | 1 | 0 |
| 2 | 2 | 0 | 1 |
| 3 | 1 | 2 | 0 |
| 4 | 0 | 2 | 1 |
| 5 | 1 | 0 | 2 |
| 6 | 0 | 1 | 2 |

An example of all possible SRS resource combinations for 4 antenna ports at the UE and K=4 is shown in Table 19. In one example, the UE can be configured with any of the SRS resource combinations from Table 19. In another example, the UE can only be configured with a fixed SRS resource combination. An example of the fixed SRS resource combination is SRS resource combination index=0. In another example, the UE can only be configured with a SRS resource combination from a subset of the all SRS resource combination in Table 19. In one example, this subset corresponds to SRS resource combination indices 0-2.

TABLE 19

SRS resource combinations for 4 antenna ports and K = 4

| SRS resource combination index | Number of 1-port SRS resource(s) | Number of 2-port SRS resource(s) | Number of 4-port SRS resource(s) |
|---|---|---|---|
| 0 | 2 | 1 | 1 |
| 1 | 1 | 2 | 1 |

TABLE 19-continued

SRS resource combinations for 4 antenna ports and K = 4

| SRS resource combination index | Number of 1-port SRS resource(s) | Number of 2-port SRS resource(s) | Number of 4-port SRS resource(s) |
|---|---|---|---|
| 2 | 1 | 1 | 2 |
| 3 | 3 | 1 | 0 |
| 4 | 3 | 0 | 1 |
| 5 | 1 | 3 | 0 |
| 6 | 0 | 3 | 1 |
| 7 | 1 | 0 | 3 |
| 8 | 0 | 1 | 3 |
| 9 | 2 | 2 | 0 |
| 10 | 2 | 0 | 2 |
| 11 | 0 | 2 | 2 |

In embodiment 4, when the UE is configured with codebook-based UL transmission (e.g., via higher layer parameter txConfig codebook) and also configured with full power UL transmission according to some embodiments of this disclosure (e.g., via higher layer parameter ulFPTx or ulFPTxModes=Mode 2), the UE can be configured with multiple SRS resources with different number of SRS ports. If there are four antenna ports at the UE, then the UE can be configured with multiple SRS resources with number of SRS ports belonging to {1,2,4} or {1,2,3,4}, as proposed in some embodiments on this disclosure. For a UE reporting its UE capability of 'partialAndNonCoherent' transmission, when configured with multiple SRS resources with the same number of SRS ports, where the number of SRS ports=4, the UE shall expect to be configured with higher layer parameter codebookSubset='nonCoherent' or 'partialAndNonCoherent' for the codebook for TRI/TPMI indication (via DCI). For a UE reporting its UE capability of 'partialAndNonCoherent' transmission, when configured with at least 2 (≥2) SRS resources with one SRS resource with 4 SRS ports, and another SRS resource with 2 SRS ports, then the codebook for TRI/TPMI indication (via DCI) is according to at least one of the following alternatives.

In one alternative Alt 4-0, the UE shall expect to be configured with higher layer parameter codebookSubset='nonCoherent', and the UE shall not expect to be configured with higher layer parameter codebookSubset='partialAndNonCoherent'. Alternatively, the higher layer parameter codebookSubset need not be configured since the codebook is fixed to 'nonCoherent'.

In one alternative Alt 4-1, when the UE is configured with higher layer parameter codebookSubset='partialAndNonCoherent' when the SRI (indicated via DCI) indicates the SRS resource with 4 SRS ports, then the UE uses Rel. 15 4Tx UL codebook for 'partialAndNonCoherent' for TRI/TPMI indication.

when the SRI (indicated via DCI) indicates the SRS resource with 2 SRS ports, then at least one of the following alternatives is used.

In one alternative Alt 4-1-0: UE uses Rel. 15 2Tx UL codebook for 'fullyAndPartialAndNonCoherent' for TRI/TPMI indication.

In one alternative Alt 4-1-1: UE uses Rel. 15 2Tx UL codebook for 'partialAndNonCoherent' for TRI/TPMI indication.

In one alternative Alt 4-1-2: UE uses Rel. 15 2Tx UL codebook for 'nonCoherent' for TRI/TPMI indication.

In one alternative Alt 4-1-3: UE uses Rel. 15 2Tx UL codebook for 'nonCoherent' or 'partialAndNonCoherent' (optionally, 'nonCoherent' or 'fullyAndPartialAndNonCoherent') for TRI/TPMI indication. At least one of the following sub-alternatives is used.
  In one alternative Alt 4-1-3-1: Whether the 2Tx codebook is 'nonCoherent' or 'partialAndNonCoherent' (optionally, 'nonCoherent' or 'fullyAndPartialAndNonCoherent') can be configured via higher layer (RRC) signaling either via a separate parameter or together with other parameter(s).
  In one alternative Alt 4-1-3-2: Whether the 2Tx codebook is 'nonCoherent' or 'partialAndNonCoherent' (optionally, 'nonCoherent' or 'fullyAndPartialAndNonCoherent') can be subject to UE capability, i.e., the UE reports it via its capability signaling either via a separate filed or together with other field(s). If the UE reports only one of 'nonCoherent' or 'partialAndNonCoherent' (optionally, 'nonCoherent' or 'fullyAndPartialAndNonCoherent'), then the codebook reported by the UE is used. Or, if the UE reports both 'nonCoherent' and 'partialAndNonCoherent' (optionally, 'nonCoherent' and 'fullyAndPartialAndNonCoherent'), then one of the two codebook is configured via higher layer (RRC) signaling either via a separate parameter or together with other parameter(s).

In one alternative Alt 4-2, when the UE is configured with higher layer parameter codebookSubset='nonCoherent'
  when the SRI (indicated via DCI) indicates the SRS resource with 4 SRS ports, then the UE uses Rel. 15 4Tx UL codebook for 'nonCoherent' for TRI/TPMI indication.
  when the SRI (indicated via DCI) indicates the SRS resource with 2 SRS ports, then at least one of the following alternatives is used.
    In one alternative Alt 4-2-0: UE uses Rel. 15 2Tx UL codebook for 'fullyAndPartialAndNonCoherent' for TRI/TPMI indication.
    In one alternative Alt 4-2-1: UE uses Rel. 15 2Tx UL codebook for 'partialAndNonCoherent' for TRI/TPMI indication.
    In one alternative Alt 4-2-2: UE uses Rel. 15 2Tx UL codebook for 'nonCoherent' for TRI/TPMI indication.
    In one alternative Alt 4-2-3: UE uses Rel. 15 2Tx UL codebook for 'nonCoherent' or 'partialAndNonCoherent' (optionally, 'nonCoherent' or 'fullyAndPartialAndNonCoherent') for TRI/TPMI indication. At least one of the following sub-alternatives is used.
      In one alternative Alt 4-2-3-1: Whether the 2Tx codebook is 'nonCoherent' or 'partialAndNonCoherent' (optionally, 'nonCoherent' or 'fullyAndPartialAndNonCoherent') can be configured via higher layer (RRC) signaling either via a separate parameter or together with other parameter(s).
      In one alternative Alt 4-2-3-2: Whether the 2Tx codebook is 'nonCoherent' or 'partialAndNonCoherent' (optionally, 'nonCoherent' or 'fullyAndPartialAndNonCoherent') can be subject to UE capability, i.e., the UE reports it via its capability signaling either via a separate filed or together with other field(s). If the UE reports only one of 'nonCoherent' or 'partialAndNonCoherent' (optionally, 'nonCoherent' or 'fullyAndPartialAndNonCoherent'), then the codebook reported by the UE is used. Or, if the UE reports both 'nonCoherent' and 'partialAndNonCoherent' (optionally, 'nonCoherent' and 'fullyAndPartialAndNonCoherent'), then one of the two codebook is configured via higher layer (RRC) signaling either via a separate parameter or together with other parameter(s).

In one alternative Alt 4-3, regardless of whether the UE is configured with higher layer parameter codebookSubset='nonCoherent' or 'partialAndNonCoherent'
  when the SRI (indicated via DCI) indicates the SRS resource with 4 SRS ports, then the UE uses Rel. 15 4Tx UL codebook for 'nonCoherent' or 'partialAndNonCoherent' (according to the configuration) for TRI/TPMI indication.
  when the SRI (indicated via DCI) indicates the SRS resource with 2 SRS ports, then at least one of the following alternatives is used.
    In one alternative Alt 4-3-0: UE uses Rel. 15 2Tx UL codebook for 'fullyAndPartialAndNonCoherent' for TRI/TPMI indication.
    In one alternative Alt 4-3-1: UE uses Rel. 15 2Tx UL codebook for 'partialAndNonCoherent' for TRI/TPMI indication.
    In one alternative Alt 4-3-2: UE uses Rel. 15 2Tx UL codebook for 'nonCoherent' for TRI/TPMI indication.
    In one alternative Alt 4-3-3: UE uses Rel. 15 2Tx UL codebook for 'nonCoherent' or 'partialAndNonCoherent' (optionally, 'nonCoherent' or 'fullyAndPartialAndNonCoherent') for TRI/TPMI indication. At least one of the following sub-alternatives is used.
      In one alternative Alt 4-3-3-1: Whether the 2Tx codebook is 'nonCoherent' or 'partialAndNonCoherent' (optionally, 'nonCoherent' or 'fullyAndPartialAndNonCoherent') can be configured via higher layer (RRC) signaling either via a separate parameter or together with other parameter(s).
      In one alternative Alt 4-3-3-2: Whether the 2Tx codebook is 'nonCoherent' or 'partialAndNonCoherent' (optionally, 'nonCoherent' or 'fullyAndPartialAndNonCoherent') can be subject to UE capability, i.e., the UE reports it via its capability signaling either via a separate filed or together with other field(s). If the UE reports only one of 'nonCoherent' or 'partialAndNonCoherent' (optionally, 'nonCoherent' or 'fullyAndPartialAndNonCoherent'), then the codebook reported by the UE is used. Or, if the UE reports both 'nonCoherent' and 'partialAndNonCoherent' (optionally, 'nonCoherent' and 'fullyAndPartialAndNonCoherent'), then one of the two codebook is configured via higher layer (RRC) signaling either via a separate parameter or together with other parameter(s).

In one example, only one of Alt 4-1 through Alt 4-3 is fixed (supported). In another example, multiple of Alt 4-1 through Alt 4-3 is supported, and the one of the supported alternative is configured via higher layer (RRC) signaling.

In one example, only one of Alt 4-1-0 through Alt 4-1-3 is fixed (supported). In another example, multiple of Alt 4-1-0 through Alt 4-1-3 is supported, and the one of the supported alternative is configured via higher layer (RRC) signaling.

In one example, only one of Alt 4-2-0 through Alt 4-2-3 is fixed (supported). In another example, multiple of Alt 4-2-0 through Alt 4-2-3 is supported, and the one of the supported alternative is configured via higher layer (RRC) signaling.

In one example, only one of Alt 4-3-0 through Alt 4-3-3 is fixed (supported). In another example, multiple of Alt 4-3-0 through Alt 4-3-3 is supported, and the one of the supported alternative is configured via higher layer (RRC) signaling.

In one example, only one of Alt 4-1-3-1 through Alt 4-1-3-2 is fixed (supported). In another example, multiple of Alt 4-1-3-1 through Alt 4-1-3-2 is supported, and the one of the supported alternative is configured via higher layer (RRC) signaling.

In one example, only one of Alt 4-2-3-1 through Alt 4-2-3-2 is fixed (supported). In another example, multiple of Alt 4-2-3-1 through Alt 4-2-3-2 is supported, and the one of the supported alternative is configured via higher layer (RRC) signaling.

In one example, only one of Alt 4-3-3-1 through Alt 4-3-3-2 is fixed (supported). In another example, multiple of Alt 4-3-3-1 through Alt 4-3-3-2 is supported, and the one of the supported alternative is configured via higher layer (RRC) signaling.

In embodiment 5, when the UE is configured with codebook-based UL transmission (e.g., via higher layer parameter txConfig=codebook) and also configured with full power UL transmission according to some embodiments of this disclosure (e.g., via higher layer parameter ulFPTx or ulFPTxModes Mode 2), the UE can be configured with multiple SRS resources with different number of SRS ports. If there are four antenna ports at the UE, then the UE can be configured with multiple SRS resources with number of SRS ports belonging to {1,2,4} or {1,2,3,4}, as proposed in some embodiments on this disclosure.

For a UE reporting its UE capability of partial-coherent or 'partialAndNonCoherent' transmission, when configured with multiple SRS resources with the same number of SRS ports, where the number of SRS ports=4, the UE shall expect to be configured with higher layer parameter codebookSubset='nonCoherent' or 'partialAndNonCoherent' for the codebook for TRI/TPMI indication (via DCI). For a UE reporting its UE capability of full-coherent or 'fullAndPartialAndNonCoherent' transmission, when configured with multiple SRS resources with the same number of SRS ports, where the number of SRS ports=4, the UE shall expect to be configured with higher layer parameter codebookSubset='nonCoherent' or 'partialAndNonCoherent' or 'fullAndPartialAndNonCoherent' for the codebook for TRI/TPMI indication (via DCI).

When configured with at least 2 (≥2) SRS resources with one SRS resource with 4 SRS ports, and another SRS resource with 2 SRS ports, then the codebook for TRI/TPMI indication (e.g. via DCI) is according to at least one of the following alternatives:

In one alternative Alt 5.1: for a UE reporting its UE capability of 'partialAndNonCoherent' transmission, the codebook for TRI/TPMI indication is according to at least one the alternatives in embodiment 4. For a UE reporting its UE capability of 'fullAndPartialAndNon-Coherent' transmission,
when the SRI (e.g. indicated via DCI) indicates the SRS resource with 4 SRS ports, then the UE is configured to use Rel. 15 4Tx UL codebook configured via higher layer parameter codebookSubset (where codebookSubset can be configured from 'nonCoherent' or 'partialAndNonCoherent' or 'fullAndPartialAndNonCoherent') for TRI/TPMI indication (cf. Table 8).
when the SRI (e.g. indicated via DCI) indicates the SRS resource with 2 SRS ports, then the UE is configured to use Rel. 15 2Tx UL codebook corresponding to 'fullAndPartialAndNonCoherent' codebook subset for TRI/TPMI indication (cf. Table 7).

In one alternative Alt 5.2: for a UE reporting its UE capability of 'partialAndNonCoherent' transmission,
when the SRI (e.g. indicated via DCI) indicates the SRS resource with 4 SRS ports, then the UE is configured to use Rel. 15 4Tx UL codebook configured via higher layer parameter codebookSubset (where codebookSubset can be configured from 'nonCoherent' or 'partialAndNonCoherent') for TRI/TPMI indication (cf. Table 8).
when the SRI (e.g. indicated via DCI) indicates the SRS resource with 2 SRS ports, then the UE is configured to use Rel. 15 2Tx UL codebook corresponding to 'nonCoherent' codebook subset for TRI/TPMI indication (cf. Table 7).

For a UE reporting its UE capability of 'fullAndPartialAndNonCoherent' transmission,
when the SRI (e.g. indicated via DCI) indicates the SRS resource with 4 SRS ports, then the UE is configured to use Rel. 15 4Tx UL codebook configured via higher layer parameter codebookSubset (where codebookSubset can be configured from 'nonCoherent' or 'partialAndNonCoherent' or 'fullAndPartialAndNonCoherent') for TRI/TPMI indication (cf. Table 8).
when the SRI (e.g. indicated via DCI) indicates the SRS resource with 2 SRS ports, then the UE is configured to use Rel. 15 2Tx UL codebook corresponding to 'fullAndPartialAndNonCoherent' codebook subset for TRI/TPMI indication (cf. Table 7).

In one alternative Alt 5.3: for a UE reporting its UE capability of 'partialAndNonCoherent' transmission, the codebook for TRI/TPMI indication is according to at least one the alternatives in embodiment 4. For a UE reporting its UE capability of 'fullAndPartialAndNon-Coherent' transmission,
when the SRI (e.g. indicated via DCI) indicates the SRS resource with 4 SRS ports, then the UE is configured to use Rel. 15 4Tx UL codebook configured via higher layer parameter codebookSubset (where codebookSubset can be configured from 'nonCoherent' or 'partialAndNonCoherent' or 'fullAndPartialAndNonCoherent') for TRI/TPMI indication (cf. Table 8).
when the SRI (e.g. indicated via DCI) indicates the SRS resource with 2 SRS ports, then the UE is configured to use Rel. 15 2Tx UL codebook corresponding to 'nonCoherent' codebook subset for TRI/TPMI indication (cf. Table 7).

In one alternative Alt 5.4: for a UE reporting its UE capability of 'partialAndNonCoherent' transmission,
when the SRI (e.g. indicated via DCI) indicates the SRS resource with 4 SRS ports, then the UE is configured to use Rel. 15 4Tx UL codebook configured via higher layer parameter codebookSubset (where codebookSubset can be configured from 'nonCoherent' or 'partialAndNonCoherent') for TRI/TPMI indication (cf. Table 8).
when the SRI (e.g. indicated via DCI) indicates the SRS resource with 2 SRS ports, then the UE is configured to use Rel. 15 2Tx UL codebook corresponding to 'nonCoherent' codebook subset for TRI/TPMI indication (cf. Table 7).

For a UE reporting its UE capability of 'fullAndPartialAndNonCoherent' transmission,
when the SRI (e.g. indicated via DCI) indicates the SRS resource with 4 SRS ports, then the UE is configured to use Rel. 15 4Tx UL codebook configured via higher layer parameter codebookSubset (where codebookSubset can be configured from 'nonCoherent' or 'partialAndNonCoherent' or 'fullAndPartialAndNonCoherent') for TRI/TPMI indication (cf. Table 8).

when the SRI (e.g. indicated via DCI) indicates the SRS resource with 2 SRS ports, then the UE is configured to use Rel. 15 2Tx UL codebook corresponding to 'nonCoherent' codebook subset for TRI/TPMI indication (cf. Table 7).

For a UE reporting its UE capability of 'nonCoherent' transmission, the UE is configured to use Rel. 15 UL codebook corresponding to 'nonCoherent' regardless of whether the SRI (e.g., indicated via DCI) indicates the SRS resource with 2 or 4 SRS ports.

In embodiment 6, for codebook based transmission, the UE determines its codebook subsets based on TPMI and upon the reception of higher layer parameter codebookSubset in pusch-Config for PUSCH associated with DCI format 0_1 and codebookSubset-ForDCIFormat0_2 in pusch-Config for PUSCH associated with DCI format 0_2 which may be configured with 'fullyAndPartialAndNonCoherent', or 'partialAndNonCoherent', or 'nonCoherent' depending on the UE capability. When higher layer parameter ul-FullPowerTransmission is set to 'fullpowerMode2' and the higher layer parameter codebookSubset or the higher layer parameter codebookSubset-ForDCIFormat0_2 is set to 'partialAndNonCoherent', and when the SRS-resourceSet with usage set to "codebook" includes at least one SRS resource with 4 ports and one SRS resource with 2 ports, the codebookSubset associated with the 2 port SRS is 'nonCoherent'. The maximum transmission rank may be configured by the higher layer parameter maxRank in pusch-Config for PUSCH scheduled with DCI format 0_1 and maxRankForDCIFormat0_2 for PUSCH scheduled with DCI format 0_2. A UE reporting its UE capability of 'partialAndNonCoherent' transmission shall not expect to be configured by either codebookSubset or codebookSubset-ForDCIFormat0_2 with 'fullyAndPartialAndNonCoherent'.

A UE reporting its UE capability of 'partialAndNonCoherent' transmission shall not expect to be configured by either codebookSubset or codebookSubset-ForDCIFormat0_2 with 'fullyAndPartialAndNonCoherent'.

A UE reporting its UE capability of 'nonCoherent' transmission shall not expect to be configured by either codebookSubset or codebookSubset-ForDCIFormat0_2 with 'fullyAndPartialAndNonCoherent' or with 'partialAndNonCoherent'.

A UE shall not expect to be configured with the higher layer parameter codebookSubset or the higher layer parameter codebookSubset-ForDCIFormat0_2 set to 'partialAndNonCoherent' when higher layer parameter nrofSRS-Ports in an SRS-ResourceSet with usage set to 'codebook' indicates that the maximum number of the configured SRS antenna ports in the SRS-ResourceSet is two.

A UE reporting its UE capability of 'fullAndPartialAndNonCoherent' transmission shall not expect to be configured with higher layer parameter ul-FullPowerTransmission set to 'fullpowerMode1'. For such as a (fullAndPartialAndNonCoherent) UE, at least one of the following alternatives is used for UE capability signalling and higher layer configuration regarding the full power UL transmission.

In one alternative Alt 6-1: the UE reports via its capability signaling whether it can support the full power UL transmission according to fullpowerMode0 or/and fullpowerMode2. Note that the UE is not expected to report the full power UL transmission according to fullpowerMode1. The gNB or network (NW) can configure the full power UL transmission to the UE via higher layer signaling of parameter FullPowerTransmission set to fullpowerMode0 or fullpowerMode2. In one example, UL full power transmission mode of fullpowerMode0 is replaced with fullpower.

In one alternative Alt 6-2: the UE reports via its capability signaling whether it can support the full power UL transmission according to fullpowerMode0 or/and fullpowerMode1 or/and fullpowerMode2. Note that the UE can report the full power UL transmission according to fullpowerMode1. However, the gNB or network (NW) can configure the full power UL transmission to the UE via higher layer signaling of parameter FullPowerTransmission set to fullpowerMode0 or fullpowerMode2. That is, the gNB is not expected to configure the full power UL transmission to the UE via higher layer signaling of parameter FullPowerTransmission set to fullpowerMode1. In one example, UL full power transmission mode of fullpowerMode0 is replaced with fullpower.

Alternatively, a UE reporting its UE capability of 'fullAndPartialAndNonCoherent' transmission shall not expect to be configured with higher layer parameter ul-FullPowerTransmission set to 'fullpowerMode1' and codebookSubset or codebookSubset-ForDCIFormat0_2 set to 'fullyAndPartialAndNonCoherent' simultaneously. For such as a (fullAndPartialAndNonCoherent) UE, at least one of the alternatives Alt 6-1 and Alt 6-2 is used for UE capability signalling and higher layer configuration regarding the full power UL transmission.

SRS-ResourceSet with usage set to 'codebook' and only one SRS resource can be indicated based on the SRI from within the SRS resource set. Except when higher layer parameter ul-FullPowerTransmission is set to 'fullpowerMode2', the maximum number of configured SRS resources for codebook based transmission is 2. If aperiodic SRS is configured for a UE, the SRS request field in DCI triggers the transmission of aperiodic SRS resources. The UE shall transmit PUSCH using the same antenna port(s) as the SRS port(s) in the SRS resource indicated by the DCI format 0_1 or 0_2 or by configuredGrantConfig according to clause 6.1.2.3.

The DM-RS antenna ports $\{\tilde{p}_0, \ldots, \tilde{p}_{\upsilon-1}\}$ in Clause 6.4.1.1.3 of [4, TS38.211] are determined according to the ordering of DM-RS port(s) given by Tables 7.3.1.1.2-6 to 7.3.1.1.2-23 in Clause 7.3.1.1.2 of [5, TS 38.212].

Except when higher layer parameter ul-FullPowerTransmission is set to 'fullpowerMode2', when multiple SRS resources are configured by SRS-ResourceSet with usage set to 'codebook', the UE shall expect that higher layer parameters nrofSRS-Ports in SRS-Resource in SRS-ResourceSet shall be configured with the same value for all these SRS resources.

When higher layer parameter ul-FullPowerTransmission is set to 'fullpowerMode2', the UE can be configured with one SRS resource or multiple SRS resources with same or different number of SRS ports within an SRS resource set with usage set to 'codebook'.

up to 2 different spatial relations can be configured for all SRS resources in the SRS resource set with usage set to 'codebook' when multiple SRS resources are configured in the SRS resource set.

subject to UE capability, a maximum of 2 or 4 SRS resources are supported in an SRS resource set with usage set to 'codebook'

The UL power control for PUSCH transmission is applied as follows. For a PUSCH transmission on active UL BWP b, as described in Clause 12 of [TS 38.211], of carrier f of serving cell c, a UE first calculates a linear value $\hat{P}_{PUSCH,b,f,c}(i,j,q_d,l)$ Of the transmit power $P_{PUSCH,b,f,c}(i,j,q_d,l)$, with parameters as defined in Clause 7.1.1 of [TS 38.211]. For a PUSCH transmission scheduled by a DCI format or configured by ConfiguredGrantConfig or semiPersistentOnPUSCH, if txConfig in PUSCH-Config is set to 'codebook', if ul-FullPowerTransmission in PUSCH-Config is provided, the UE scales $\hat{P}_{PUSCH,b,f,c}(i,j,q_d,l)$ by s where:

if ul-FullPowerTransmission in PUSCH-Config is set to fullpowerMode1, and each SRS resource in the SRS-ResourceSet with usage set to 'codebook' has more than one SRS port, s is the ratio of a number of antenna ports with non-zero PUSCH transmission power over the maximum number of SRS ports supported by the UE in one SRS resource if ul-FullPowerTransmission in PUSCH-Config is set to fullpowerMode2 s=1 for full power TPMIs reported by the UE [16, TS 38.306], and s is the ratio of a number of antenna ports with non-zero PUSCH transmission power over a number of SRS ports for remaining TPMIs, where the number of SRS ports is associated with a SRS resource indicated by a SRI field in a DCI format scheduling the PUSCH transmission if more than one SRS resource is configured in the SRS-ResourceSet with usage set to 'codebook', or indicated by Type 1 configured grant, or the number of SRS ports is associated with the SRS resource if only one SRS resource is configured in the SRS-ResourceSet with usage set to 'codebook', s=1, if a SRS resource with a single port is indicated by a SRI field in a DCI format scheduling the PUSCH transmission when more than one SRS resource is provided in the SRS-ResourceSet with usage set to 'codebook', or indicated by Type 1 configured grant, or if only one SRS resource with a single port is provided in the SRS-ResourceSet with usage set to 'codebook', and if ul-FullPowerTransmission in PUSCH-Config is set to fullpower, s=1 else, if each SRS resource in the SRS-ResourceSet with usage set to 'codebook' has more than one SRS port, the UE scales the linear value by the ratio of the number of antenna ports with a non-zero PUSCH transmission power to the maximum number of SRS ports supported by the UE in one SRS resource.

The UE splits the power equally across the antenna ports on which the UE transmits the PUSCH with non-zero power.

Figure 13:
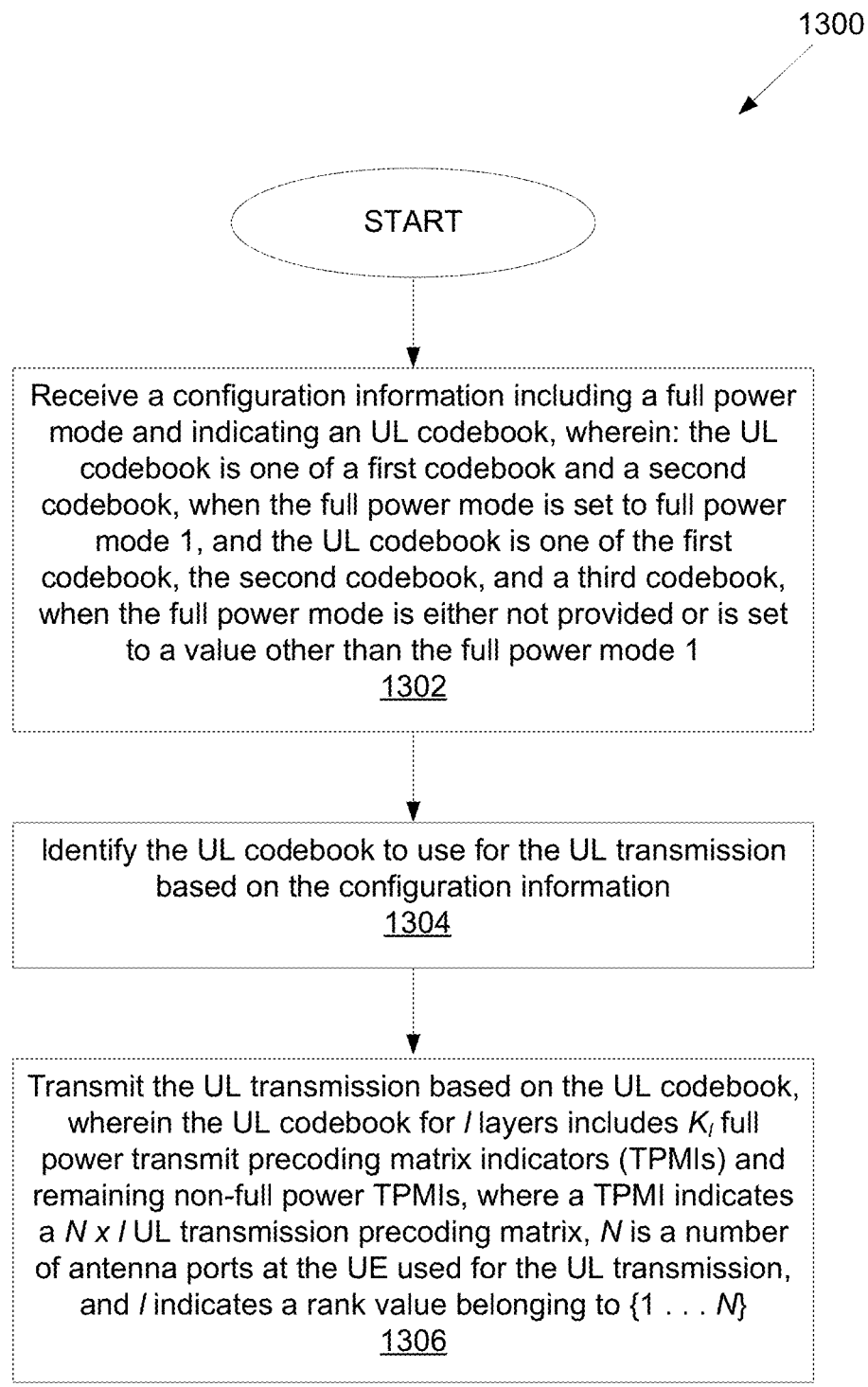
FIG. 13 illustrates a flow chart of a method as may be performed by a user equipment (UE), according to embodiments of the present disclosure.

FIG. 13 illustrates a flow chart of a method 1300, as may be performed by a UE, according to embodiments of the present disclosure. The embodiment of the method 1300 illustrated in FIG. 13 is for illustration only. FIG. 13 does not limit the scope of this disclosure to any particular implementation.

As illustrated in FIG. 13, the method 1300 begins at step 1302. In step 1302, the UE (e.g., 111-116 as illustrated in FIG. 1) receives a configuration information including a full power mode and indicating an UL codebook, wherein: the UL codebook is one of a first codebook and a second codebook, when the full power mode is set to full power mode 1, and the UL codebook is one of the first codebook, the second codebook, and a third codebook, when the full power mode is either not provided or is set to a value other than the full power mode 1.

In step 1304, the UE identifies the UL codebook to use for the UL transmission based on the configuration information.

In step 1306, the UE transmits the UL transmission based on the UL codebook, wherein the UL codebook for l layers includes $K_l$ full power transmit precoding matrix indicators (TPMIs) and remaining non-full power TPMIs, where a TPMI indicates a N×l UL transmission precoding matrix, N is a number of antenna ports at the UE used for the UL transmission, and l indicates a rank value belonging to $\{1, \ldots, N\}$.

In one embodiment, the UE transmits a UE capability information including a full power capability and a coherence capability, where the full power capability indicates that the UE is capable of being configured with the full power mode 1 and the coherence capability indicates that the UE is capable of being configured with one of the first codebook, the second codebook, and the third codebook if N=4; and one of the first codebook and the third codebook if N=2.

In one embodiment, if N=2: the UL codebook is the first codebook, when the full power mode is set to full power mode 1, and the UL codebook is one of the first codebook and the third codebook, when the full power mode is either not provided or is set to a value other than the full power mode 1; and if N=4: the UL codebook is one of the first codebook and the second codebook, when the full power mode is set to full power mode 1, and the UL codebook is one of the first codebook, the second codebook, and the third codebook, when the full power mode is either not provided or is set to a value other than the full power mode 1.

In one embodiment, the third codebook includes at least one full power TPMI ($K_l \geq 1$) for all l values; and if N=4, the third codebook includes three types of TPMIs, namely, full-coherent, partial-coherent, and non-coherent TPMIs, and if N=2, the third codebook includes two types of TPMIs, namely, full-coherent, and non-coherent TPMIs.

In one embodiment, when N=4 and the full power mode is either not provided or is set to a value other than the full power mode 1: the second codebook does not include any full power TPMIs ($K_l = 0$) for at least one l value; and the second codebook includes two types of TPMIs, namely, partial-coherent and non-coherent TPMIs.

In one embodiment, when N=4 and the full power mode is set to the full power mode 1: the second codebook includes at least one full power TPMI ($K_l \geq 1$) for all l values; and the second codebook includes three types of TPMIs, namely, full-coherent, partial-coherent, and non-coherent TPMIs.

In one embodiment, when the full power mode is either not provided or is set to a value other than the full power mode 1: the first codebook does not include any full power TPMIs ($K_l = 0$) for at least one l value; and the first codebook includes only non-coherent TPMIs.

In one embodiment, when the full power mode is set to the full power mode 1: the first codebook includes at least one full power TPMI ($K_l \geq 1$) for all l values; and if N=4, the first codebook includes three types of TPMIs, namely, full-coherent, partial-coherent, and non-coherent TPMIs, and if N=2, the first codebook includes two types of TPMIs, namely, full-coherent, and non-coherent TPMIs.

Figure 14:
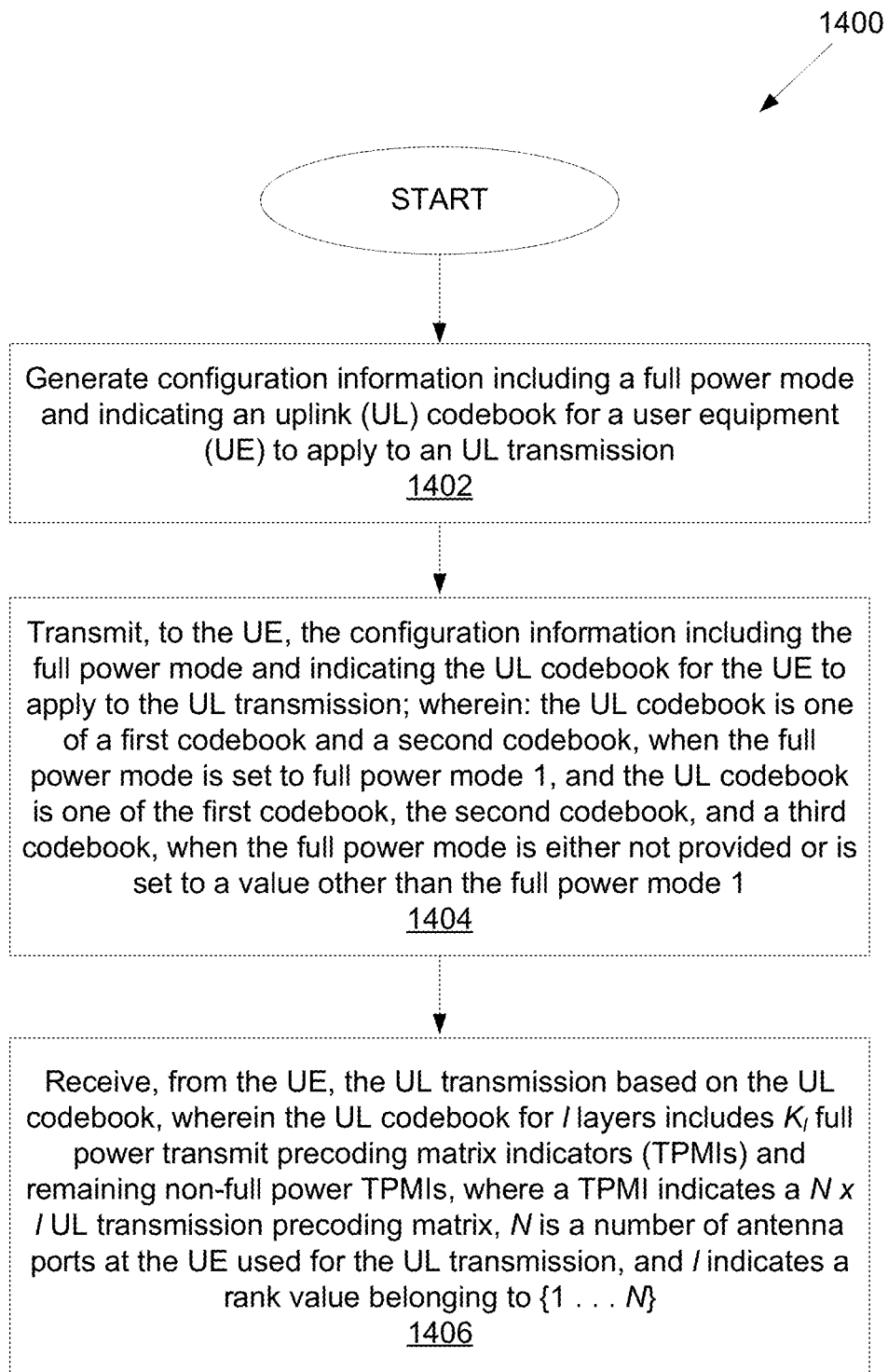
FIG. 14 illustrates a flow chart of another method as may be performed by a base station (BS), according to embodiments of the present disclosure.

FIG. 14 illustrates a flow chart of another method 1400, as may be performed by a base station (BS), according to embodiments of the present disclosure. The embodiment of the method 1400 illustrated in FIG. 14 is for illustration only. FIG. 14 does not limit the scope of this disclosure to any particular implementation.

As illustrated in FIG. 14, the method 1400 begins at step 1402. In step 1402, the BS (e.g., 101-103 as illustrated in FIG. 1), generates configuration information including a full power mode and indicating an uplink (UL) codebook for a user equipment (UE) to apply to an UL transmission.

In step 1404, the BS transmits, to the UE, the configuration information including the full power mode and indicating the UL codebook for the UE to apply to the UL transmission; wherein: the UL codebook is one of a first codebook and a second codebook, when the full power mode is set to full power mode 1, and the UL codebook is one of the first codebook, the second codebook, and a third codebook, when the full power mode is either not provided or is set to a value other than the full power mode 1.

In step 1406, the BS receives, from the UE, the UL transmission based on the UL codebook, wherein the UL codebook for l layers includes $K_l$ full power transmit precoding matrix indicators (TPMIs) and remaining non-full power TPMIs, where a TPMI indicates a N×l UL transmission precoding matrix, N is a number of antenna ports at the UE used for the UL transmission, and l indicates a rank value belonging to $\{1, \ldots, N\}$.

In one embodiment, the BS receives a UE capability information including a full power capability and a coherence capability, where the full power capability indicates that the UE is capable of being configured with the full power mode 1 and the coherence capability indicates that the UE is capable of being configured with one of the first codebook, the second codebook, and the third codebook if N=4; and one of the first codebook and the third codebook if N=2.

In one embodiment, if N=2: the UL codebook is the first codebook, when the full power mode is set to full power mode 1, and the UL codebook is one of the first codebook and the third codebook, when the full power mode is either not provided or is set to a value other than the full power mode 1; and if N=4: the UL codebook is one of the first codebook and the second codebook, when the full power mode is set to full power mode 1, and the UL codebook is one of the first codebook, the second codebook, and the third codebook, when the full power mode is either not provided or is set to a value other than the full power mode 1.

In one embodiment, the third codebook includes at least one full power TPMI ($K_l \geq 1$) for all l values; and if N=4, the third codebook includes three types of TPMIs, namely, full-coherent, partial-coherent, and non-coherent TPMIs, and if N=2, the third codebook includes two types of TPMIs, namely, full-coherent, and non-coherent TPMIs.

In one embodiment, when N=4 and the full power mode is either not provided or is set to a value other than the full power mode 1: the second codebook does not include any full power TPMIs ($K_l=0$) for at least one l value; and the second codebook includes two types of TPMIs, namely, partial-coherent and non-coherent TPMIs.

In one embodiment, when N=4 and the full power mode is set to the full power mode 1: the second codebook includes at least one full power TPMI ($K_l \geq 1$) for all l values; and the second codebook includes three types of TPMIs, namely, full-coherent, partial-coherent, and non-coherent TPMIs.

In one embodiment, when the full power mode is either not provided or is set to a value other than the full power mode 1: the first codebook does not include any full power TPMIs ($K_l=0$) for at least one l value; and the first codebook includes only non-coherent TPMIs.

In one embodiment, when the full power mode is set to the full power mode 1: the first codebook includes at least one full power TPMI ($K_l \geq 1$) for all l values; and if N=4, the first codebook includes three types of TPMIs, namely, full-coherent, partial-coherent, and non-coherent TPMIs, and if N=2, the first codebook includes two types of TPMIs, namely, full-coherent, and non-coherent TPMIs.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) for an uplink (UL) transmission, the UE comprising:
    a transceiver configured to:
        receive a configuration information including a full power mode and indicating an UL codebook, wherein:
            the UL codebook is one of a first codebook and a second codebook, when the full power mode is set to full power mode 1, and
            the UL codebook is one of the first codebook, the second codebook, and a third codebook, when the full power mode is either not provided or is set to a value other than the full power mode 1; and
    a processor operably connected to the transceiver, the processor configured to identify the UL codebook to use for the UL transmission based on the configuration information,
    wherein the transceiver is further configured to transmit the UL transmission based on the UL codebook, and
    wherein the UL codebook for l layers includes $K_l$ full power transmit precoding matrix indicators (TPMIs) and remaining non-full power TPMIs, where a TPMI indicates a N×l UL transmission precoding matrix, N is a number of antenna ports at the UE used for the UL transmission, and l indicates a rank value belonging to $\{1, \ldots, N\}$.

2. The UE of claim 1, wherein:
    the transceiver is further configured to transmit a UE capability information including a full power capability and a coherence capability, the full power capability indicates that the UE is capable of being configured with the full power mode 1, and the coherence capability indicates that the UE is capable of being configured with: one of the first codebook, the second codebook, and the third codebook if N=4; and one of the first codebook and the third codebook if N=2.

3. The UE of claim 1, wherein:

if N=2:

the UL codebook is the first codebook, when the full power mode is set to full power mode 1, and the UL codebook is one of the first codebook and the third codebook, when the full power mode is either not provided or is set to a value other than the full power mode 1; and if N=4:

the UL codebook is one of the first codebook and the second codebook, when the full power mode is set to full power mode 1, and the UL codebook is one of the first codebook, the second codebook, and the third codebook, when the full power mode is either not provided or is set to a value other than the full power mode 1.

4. The UE of claim 1, wherein:

the third codebook includes at least one full power TPMI ($K_l \geq 1$) for all l values; and if N=4, the third codebook includes three types of TPMIs, namely, full-coherent, partial-coherent, and non-coherent TPMIs, and if N=2, the third codebook includes two types of TPMIs, namely, full-coherent, and non-coherent TPMIs.

5. The UE of claim 1, wherein, when N=4 and the full power mode is either not provided or is set to a value other than the full power mode 1:

the second codebook does not include any full power TPMIs ($K_l=0$) for at least one l value; and the second codebook includes two types of TPMIs, namely, partial-coherent and non-coherent TPMIs.

6. The UE of claim 1, wherein, when N=4 and the full power mode is set to the full power mode 1:

the second codebook includes at least one full power TPMI ($K_l \geq 1$) for all l values; and the second codebook includes three types of TPMIs, namely, full-coherent, partial-coherent, and non-coherent TPMIs.

7. The UE of claim 1, wherein when the full power mode is either not provided or is set to a value other than the full power mode 1:

the first codebook does not include any full power TPMIs ($K_l=0$) for at least one l value; and the first codebook includes only non-coherent TPMIs.

8. The UE of claim 1, wherein, when the full power mode is set to the full power mode 1:

the first codebook includes at least one full power TPMI ($K_l \geq 1$) for all l values; and if N=4, the first codebook includes three types of TPMIs, namely, full-coherent, partial-coherent, and non-coherent TPMIs, and if N=2, the first codebook includes two types of TPMIs, namely, full-coherent, and non-coherent TPMIs.

9. A base station (BS) comprising:

a transceiver; and a processor operably connected to the transceiver, the processor configured to generate configuration information including a full power mode and indicating an uplink (UL) codebook for a user equipment (UE) to apply to an UL transmission;

wherein the transceiver is further configured to:

transmit, to the UE, the configuration information including the full power mode and indicating the UL codebook for the UE to apply to the UL transmission; wherein:

the UL codebook is one of a first codebook and a second codebook, when the full power mode is set to full power mode 1, and the UL codebook is one of the first codebook, the second codebook, and a third codebook, when the full power mode is either not provided or is set to a value other than the full power mode 1; and receive, from the UE, the UL transmission based on the UL codebook, wherein the UL codebook for l layers includes $K_l$ full power transmit precoding matrix indicators (TPMIs) and remaining non-full power TPMIs, where a TPMI indicates a N×l UL transmission precoding matrix, N is a number of antenna ports at the UE used for the UL transmission, and l indicates a rank value belonging to $\{1, \ldots, N\}$.

10. The BS of claim 9, wherein:

the transceiver is further configured to receive a UE capability information including a full power capability and a coherence capability, the full power capability indicates that the UE is capable of being configured with the full power mode 1, and the coherence capability indicates that the UE is capable of being configured with: one of the first codebook, the second codebook, and the third codebook if N=4; and one of the first codebook and the third codebook if N=2.

11. The BS of claim 9, wherein:

if N=2:

the UL codebook is the first codebook, when the full power mode is set to full power mode 1, and the UL codebook is one of the first codebook and the third codebook, when the full power mode is either not provided or is set to a value other than the full power mode 1; and if N=4:

the UL codebook is one of the first codebook and the second codebook, when the full power mode is set to full power mode 1, and the UL codebook is one of the first codebook, the second codebook, and the third codebook, when the full power mode is either not provided or is set to a value other than the full power mode 1.

12. The BS of claim 9, wherein:

the third codebook includes at least one full power TPMI ($K_l \geq 1$) for all l values; and if N=4, the third codebook includes three types of TPMIs, namely, full-coherent, partial-coherent, and non-coherent TPMIs, and if N=2, the third codebook includes two types of TPMIs, namely, full-coherent, and non-coherent TPMIs.

13. The BS of claim 9, wherein, when N=4 and the full power mode is either not provided or is set to a value other than the full power mode 1:

the second codebook does not include any full power TPMIs ($K_l=0$) for at least one l value; and the second codebook includes two types of TPMIs, namely, partial-coherent and non-coherent TPMIs.

14. The BS of claim 9, wherein, when N=4 and the full power mode is set to the full power mode 1:

the second codebook includes at least one full power TPMI ($K_l \geq 1$) for all l values; and the second codebook includes three types of TPMIs, namely, full-coherent, partial-coherent, and non-coherent TPMIs.

15. The BS of claim 9, wherein when the full power mode is either not provided or is set to a value other than the full power mode 1:
the first codebook does not include any full power TPMIs ($K_l=0$) for at least one l value; and
the first codebook includes only non-coherent TPMIs.

16. The BS of claim 9, wherein, when the full power mode is set to the full power mode 1:
the first codebook includes at least one full power TPMI ($K_l \geq 1$) for all l values; and
if N=4, the first codebook includes three types of TPMIs, namely, full-coherent, partial-coherent, and non-coherent TPMIs, and
if N=2, the first codebook includes two types of TPMIs, namely, full-coherent, and non-coherent TPMIs.

17. A method for operating a user equipment (UE) for an uplink (UL) transmission, the method comprising:
receiving a configuration information including a full power mode and indicating an UL codebook, wherein:
the UL codebook is one of a first codebook and a second codebook, when the full power mode is set to full power mode 1, and
the UL codebook is one of the first codebook, the second codebook, and a third codebook, when the full power mode is either not provided or is set to a value other than the full power mode 1;
identifying the UL codebook to use for the UL transmission based on the configuration information; and
transmitting the UL transmission based on the UL codebook,
wherein the UL codebook for l layers includes $K_l$ full power transmit precoding matrix indicators (TPMIs) and remaining non-full power TPMIs, where a TPMI indicates a N×l UL transmission precoding matrix, N is a number of antenna ports at the UE used for the UL transmission, and l indicates a rank value belonging to {1, . . . , N}.

18. The method of claim 17, further comprising:
transmitting a UE capability information including a full power capability and a coherence capability,
wherein the full power capability indicates that the UE is capable of being configured with the full power mode 1,
wherein and the coherence capability indicates that the UE is capable of being configured with: one of the first codebook, the second codebook, and the third codebook when N=4; and one of the first codebook and the third codebook when N=2, and
wherein N=2 or N=4.

19. The method of claim 17, wherein:
N=2 or N=4;
when N=2:
the UL codebook is the first codebook, when the full power mode is set to full power mode 1, and
the UL codebook is one of the first codebook and the third codebook, when the full power mode is either not provided or is set to a value other than the full power mode 1; and
when N=4:
the UL codebook is one of the first codebook and the second codebook, when the full power mode is set to full power mode 1, and
the UL codebook is one of the first codebook, the second codebook, and the third codebook, when the full power mode is either not provided or is set to a value other than the full power mode 1.

20. The method of claim 17, wherein:
the third codebook includes at least one full power TPMI ($K_l \geq 1$) for all l values;
N=2 or N=4;
when N=4, the third codebook includes three types of TPMIs, namely, full-coherent, partial-coherent, and non-coherent TPMIs; and
when N=2, the third codebook includes two types of TPMIs, namely, full-coherent, and non-coherent TPMIs.

* * * * *